United States Patent [19]
Degele

[11] Patent Number: 5,297,207
[45] Date of Patent: Mar. 22, 1994

[54] MACHINE GENERATION OF CRYPTOGRAPHIC KEYS BY NON-LINEAR PROCESSES SIMILAR TO PROCESSES NORMALLY ASSOCIATED WITH ENCRYPTION OF DATA

[76] Inventor: Steven T. Degele, 1501 7th Ave. West, Williston, N. Dak. 58801

[21] Appl. No.: 66,513

[22] Filed: May 24, 1993

[51] Int. Cl.$^5$ ............................................. G06F 1/02
[52] U.S. Cl. ........................................ 380/46; 380/44; 331/78; 364/717
[58] Field of Search ............................ 380/9, 28–30, 380/44–47, 49, 50, 37, 43; 364/717; 331/78

[56] References Cited

U.S. PATENT DOCUMENTS

| | | | |
|---|---|---|---|
| 3,781,473 | 12/1973 | Goode et al. | 380/46 |
| 5,007,087 | 4/1991 | Bernstein et al. | 380/46 |
| 5,048,086 | 9/1991 | Bianco et al. | 380/28 |
| 5,054,067 | 10/1991 | Moroney et al. | 380/37 |

OTHER PUBLICATIONS

Robert Matthews, "On the Dervation of a 'Chaotic' Encryption Algorithm"; Cryptologia, (vol. XIII, No. 1; Jan. 1989; pp. 29–41).

*Primary Examiner*—Bernarr E. Gregory
*Attorney, Agent, or Firm*—William C. Fuess

[57] ABSTRACT

A keystream generation system for producing a cryptographically secure keystream by an "amorphous" process. Three types of keystream generation are preferred. A large seed key is directly amorphously expanded into a cryptographically secure keystream. A small seed key seeds a pseudo random number generator whose output is made cryptographically secure through a contracting amorphous process or, alternately, the security of an extended keystream is strengthened through contraction. Finally, a state machine whose output and transition functions are based on amorphousness recursively operates on a seed key to generate an arbitrarily long, cryptographically secure, keystream. The recursive performance of such amorphous logical operations on seed keys in order to generate keystreams is akin to the encryption of data.

33 Claims, 9 Drawing Sheets

MACHINE GENERATION OF CRYPTOGRAPHIC KEYS BY NON-LINEAR PROCESSES SIMILAR TO PROCESSES NORMALLY ASSOCIATED WITH ENCRYPTION OF DATA

RELATION TO THE RELATED PATENT APPLICATIONS

The present patent application is related to U.S. patent application Ser. No. 07/388,331, now abandoned, filed Aug. 1, 1989 for an ELECTROMAGNETIC TO PHYSICAL LOCK to the selfsame inventor of the present application. The contents of the related patent application are incorporated herein by reference.

BACKGROUND OF THE INVENTION

1. Field of the Invention

The present invention generally concerns cryptology and cryptographic machines, and particularly concerns machines for generating cryptographic keys of indeterminately long length.

2. Description of the Prior Art 2.1 Background to the Present Invention in a Nutshell The art of secret writing is very ancient, and many different systems have been used throughout history. One of the oldest known ciphers is the Spartan scytale: a transposition cipher based on winding a narrow ribbon of parchment spirally around a cylindrical staff with the message then written on the parchment. The early Greeks used substitution of numerals for letters in some of their systems, while the Romans favored the substitution of one letter for another in the form of the Caesar cipher.

While transposition ciphers seem to have disappeared from use until relatively recently, substitution ciphers continued to evolve in many different ways. With the invention of the printing press, many types of "book ciphers" were devised wherein some book was chosen as the key for the substitutions. Of course, the entire book could be viewed as one long key; thus was born the running key cipher. The running key cipher can be improved dramatically by using a book of random letters, i.e. an incoherent key.

These ideas finally crystallized in the Vernam cipher where a message is bitwise XORed with a random key. Army cryptologist Major Joseph Mauborgne then suggested that the key be used only once, and thus was born the mother of all secret key ciphers, the one-time pad. Subsequently, both William Friedman and Mauborgne arrived at the conclusion that a secure system can be achieved only if an incoherent key is used whose length is at least as long as the message. The theoretical foundation was then laid by C.E. Shannon with the idea of equivocation to provide perfect secrecy. The bad news was that perfection requires a key as long as the message.

The generation, distribution, and storage problems associated with the one-time pad has heretofore made this system impractical for most applications, so the development of small key systems continued. One development was that of block ciphers following Shannon's suggestion of using a "mixing transformation" implemented by applying several rounds of transpositions and substitutions to "diffuse" and "confuse" the statistics of the message.

Another development was the keystream ciphers based on pseudo random number generators. There was temporary interest in using linear shift registers as random number generators until they were proved to be insecure.

The degree of non-linearity required to make small key cipher systems cryptographically secure is currently an open question. A recent approach to the generation of random numbers for purposes of cryptography is to exploit some mathematically intractable problem from number theory in order to gain cryptographic security, and considerable progress has been made with respect to the efficiency of certain methods of random number generation. However, until complexity theory can show decisively that these mathematical problems on which the number generators are based are indeed intractable, a certain wariness will remain.

The present invention will be seen to be concerned with the generation of large, very-large, and indefinitely-large cryptographic keys as suit large key cryptographic systems including, notably but not by way of limitation, the one time pad. The way by which these large cryptographic keys are derived will be seen to be analogous to cryptographic processes themselves.

One analogous class of ciphers that are of special interest to the present invention is the transposition block cipher. The transposition block cipher is performable by pencil and paper, as well as by faster means such as computers. In a transposition block cipher a message is decomposed by letters into fixed length sequences with these sequences consecutively used as the rows in a $N \times M$ matrix block. A cryptogram is formed by taking the letters from, say, the 3rd column starting from the top, followed by, say, the letters in the 2nd column starting from the bottom, and so on, with this path taken being the key. Many different "flavors" of columnar transposition ciphers were devised, including the so-called ADFGVX system once used by the German Army. The ADFGVX system also utilized substitution.

In order to reach the present invention, it will be seen that (i) the technologically obsolete notion of a small key is discarded, and then (ii) the same ingenuity that Gilbert Vernam used is applied. Namely, or in other words, it will be seen that the present invention calls for the application of a bitwise transposition to a large incoherent key to generate a keystream (subsequently usable for diverse cryptographic processes in the encryption/decryption of data). The bitwise transposition will be seen to include (i) substitution through selected XORings of the "columns", and/or (ii) annihilation through skipping some of the "rows" in each "column", and/or (iii) a method of multiplexing the columns. Finally, as still another essential idea of the present invention, it will be seen that this bitwise transposition is "amorphous", meaning that, complex as the transposition may be in its substitutions and/or annihilations and/or multiplexing, it is (normally) repetitively recursively performed each time in a different way.

Cryptoanalysis of the amorphous transposition processes gives rise to a mechanical correlation problem. The intractable nature of this problem appears likely to be provable. Even if no proof of the cryptographic security of one or more of the amorphous transposition processes of the present invention is forthcoming, the apparent intractability of these amorphous processes are arguably more attractive than any competing cryptology systems having a supposed intractability of cryptoanalysis based on number theory because the latter systems have an undesirable profundity inherent in their fundamental objects such as the factoring problem. This profundity is continually being revealed as further mathematical research finds new structures which provide means for realizing better algorithms to these problems.

The bitwise transposition processes in accordance with the present invention, on the other hand, will be seen to be, quite intuitively, shapeless—hence the description "amorphous". The mathematical function(s) defined by such an amorphous process(es) will be seen to be so random that the prospects of finding any deep, analyzable, structures in the general amorphous method(s) of the present invention appears to be quite remote.

2.2 Particular Prior Art Cryptography Relevant to the Present Invention

The present invention does not directly concern the encryption or decryption of data. Instead, it concerns the generation of generally long cryptographic keys that are usable by diverse cryptographic processes, including the one time pad.

However, the present invention will be seen to call for the manipulation of a cryptographic key in a like manner, and by like processes, that former cryptographic methods and systems were wont to manipulate (e.g., encrypt or decrypt) data. Since they key manipulation methods of the present invention are (deemed by the Applicant to be) well considered as regards their preservation (and, indeed, even their inducement) of randomness, and amorphousness, in the data sets (i.e., the seed keys) to which they are applied, it will be no surprise that these manipulation methods have a certain correspondence with, and antecedents within, the known methods of cryptography. In some cases the preferred methods, and machines, of the present invention will be seen to constitute variations—arguably even improvements—to certain prior art cryptographic methods of the order of amorphous transforms. Accordingly, understanding certain particular ones of these prior art cryptographic methods will prove useful to placing the present invention in context.

2.3 It is Known to Use of the XOR Function in Cryptography

The present invention will be seen to perform the exclusive or, or XOR, function on the bits of a set. The basic idea of using an incoherent keystream to perform the XOR function on a message dates to the Vernam cipher of 1918.

2.4 Certain Types of Random Permutations Are Known to be Used in Cryptography The present invention will also be seen to teach the manipulation of the bits of a set by (essentially) random permutations. The use of random permutations in encoding is known. Permutations have been used in voice scrambling systems in both the time and frequency domains. F. Ayoub appears, in his article "Encryption with keyed random permutations", Electronic Letters, Vol 17, 1981, pages 583-585, to have been first to suggest using random permutations for digital data. Ayoub applied an optimal permutation algorithm to minimize the key bits required. Ayoub notes that this method would be useful in substitution-permutation (SP)-type encryption systems.

Ayoub shows, at least implicitly, one part of what Applicant will call a "contracting amorphous process", although Ayoub appears to have only understood permutations in the sense of using such during the encoding of data. Ayoub does not seem to view his permutations as amorphous contraction, i.e. to make the observation that if a pseudo random sequence of bits representing a key is contracted via permutations then the resulting "cipher text" is really a new, secure, key.

Applicant will also be seen to teach the use of a permutation called an "expanding amorphous process". At least some particular forms of expanding amorphous processes are known, as would be expected because of the simplicity of these forms. One early type of an expanding amorphous process is a class of transposition ciphers in which the message is written in matrix form (letter by letter) with the cryptogram formed by taking some path through the matrix to define the letters of the cryptogram. The path taken together with the dimensions of the matrix comprise the cryptographic key of these systems. Other shapes besides rectangles, e.g. triangles, were also used, as well as blocking out certain squares in the template (the irregular columnar cipher). These ciphers were originally performed with pencil and paper so the paths were fairly simple. In one common version, the path went column by column, with the columns permutated, with the letters from the individual columns taken starting from the top, or starting from the bottom, or starting from the top and bottom alternately.

These columnar ciphers will be seen to be similar to the generalized expanding amorphous processes of the present invention. However, the present invention will be seen not only to extend the application of expanding amorphous processes (i.e., to keys as opposed to data), but to add some new "twists". The present invention will be seen to teach each of (i) permuting a matrix of random bits in a feedback mode, (ii) logically complementing some bits and then multiplexing the "columns" via a holdback scheme, and (iii) an amorphous process called "dispersed partitioning".

2.5 State Machines Are Known to be Used in Cryptography

Still furthermore, the present invention will be seen to employ, in one of its embodiments, a state machine. Use of at least some parts of a state machine in keystream generation is known. Specifically, the idea of using a machine index to select a function is discussed in C.E. Shannon's paper "Communication Theory of Secrecy Systems", Bell System Technical Journal, Vol. 28, 1949, pages 656-715. Shannon analyzed ways to combine cipher systems, one basic way being to form a weighted sum consisting of a plurality of different encoding transformations with each transformation assigned a probability of being chosen for use to encode a particular message. From a conceptual standpoint, Applicant's state machine method could be interpreted as a weighted sum of random number generators with a machine index (to be explained in this specification) selecting a function (to be explained). However, Applicant's "function" will be seen to be dynamically redefined at each transition: since the state variables are also used to define this function. Furthermore, Applicant's approach in generating a "garbage index" in order to define a state transition function will deserve careful consideration when later discussed.

As an aside, it may be understood that Shannon's paper is chiefly of theoretical interest dealing in entropy and equivocation. In the course of presenting his theory Shannon did point out some things which could be applied to build a secrecy system, but his paper did not really present any new systems, and to this extent does not relate to Applicant's invention. However, one interesting point that Shannon made was that even a very simple encryption system could be used if the message was first transformed to eliminate all of its redundancies. Unfortunately, such a transformation is in practice extremely difficult, if not impossible, because of the complexity inherent in natural languages.

2.6 Certain Types of Random Number Generators Are Known to be Used in Cryptography Applicant's method and machine performs random number generation. There are several prominent approaches to random number generation (to form a keystream) that have been taken over the years that are worth mentioning. Linear shift registers have been thoroughly researched. Simple designs exist which have proven "good statistics" and very long cycle lengths. However these sequences are predicable: a small portion yields the whole sequence through a fairly simple process of inverting a matrix formed from this "intercepted" portion. The use of non-linear feedback for shift registers complicates the situation, but the security of such systems is somewhat dubious.

Shannon suggests employing a "mixing transformation" to "diffuse and confuse" the statistics of a message. Applicant's (encryption) of messages (at least directly), but rather of keys. However, Applicant's invention will perform something that could, at least broadly and generically, be called a "mixing transformation". Since most any modern digital circuitry can "throw" a lot a bits around, thereby performing the "mixing" with great vigor, it is useful to understand just how poorly "mixing transformations" have been implemented in the past in order to better assess whether the particular "mixing transformations" taught by Applicant within this specification (even though applied to keys) have cryptographic merit.

European patent number 0035048 shows, in some sense, an early non-linear shift register system. The system is an odd hybrid, comprised of block cipher type "non-affine transformations" in the form of "S" boxes (i.e. substitution tables), strangely, feedback from the message which is used to transform the key matrix. It's inventor, IBM's Horst Feistel, had in 1973 developed a well known block cipher named, of all things, LUCIFER. The banality of LUCIFER soon became apparent with this system duly broken. But its basic structure has been retained, and in fact, this structure was originally due to Shannon's suggestion of employing a "mixing transformation" to "diffuse and confuse" the statistics of a message.

Continuing with the block cipher approach to a "mixing transformation" to "diffuse and confuse", IBM was the main force behind the development of circuits (chips) to perform block ciphers. IBM waived its many patent claims for the particular block cipher derivative later called the "Data Encryption Standard", or DES. DES became the world's first encryption standard around 1978, recently losing its certification in 1986.

Linear congruential generators are another recent development. A proper choice of parameters for the equation $x_{i+1} = (a \cdot x_i + b) \mod N$ yields good random number generators. The Applicant chose this generator as a reasonable "seeding source" as will be seen. However, the numbers produced are not secure. Reference A.M. Frieze, R. Kannan, and J.C. Lagarias, "Linear Congruential Generators do not produce Random Sequences", 25th Annual Symposium on Foundations of Computer Science, IEEE Computer Society, Oct. 24–26, 1984, pages 480–484.

However, linear congruential generators can be parameterized to produce random numbers. If a non-linear component is used, a secure sequence results. Here the equation takes the form $x_2 \mod N$ (where N is the product of two distinct primes each congruent to 3 mod 4, and $x_0$ is the quadratic residue mod N) and this is used to generate the sequence $x_0, x_1, x_2, \ldots$ from which the bit sequence $b_0, b_1, b_2, \ldots$ where $b_i = \text{parity}(x_i)$ is formed. Messrs. L. Blum, M. Blum, and M. Shub show in their paper "A Simple Secure Pseudo-Random Number Generator", SIAM Journal of Computing, 1986, pages 364–383 (the main result goes back to about 1982, but many years passed before their paper was published) that the $b_i$'s are secure.

While Blum's generator (1982) is simple enough, it is rather inefficient since only one bit is emitted for each modular multiplication ($n^2$ steps) where n is the number of bits in N, typically around several hundred bits. Blum's open question of whether more than a single bit could be securely emitted was answered by the Umesh V. Vazirani and Vijay V. Vazirani in "Efficient and Secure Pseudo-Random Number Generation", 25th Annual Symposium on Foundations of Computer Science, IEEE Computer Society, Oct. 24–26, 1984, pages 458–463. The Vazirani's found a way to emit log n bits per multiplication, and their basic proof can be extended to $(\log n)_2$ efficiency.

Then, in 1988, Micali and Schnorr came up with a system based on the expression $x^d \mod N$, with their system about as efficient as the simple linear congruential generators. Reference S. Micali and C.P. Schnorr, "Efficient, Perfect Random Number Generators", Lecture Notes in Computer Science, Vol. 403, Advances in Cryptology: Proceedings of CRYPTO 88, Springer-Verlag, 1989, pages 173–198. The "proofs" for the security of these generators are based on certain complexity assumptions. Consequently, if tomorrow a good algorithm for factoring is found, the security of these systems will be invalidated. The continuing research seems to indicate that the present assumptions are pretty good, with the evidence mounting in favor of the security of these systems, but a proof as such has remained elusive and may never be found.

Implementing Micali-Schnorr's generator with a modulus of 224 bits yields 96 bits per multiplication. This about matches the efficiency of an contracting amorphous process using a 128-bit frame feed by using the upper 16-bits of a 32-bit linear congruential generator. The Micali-Schnorr system is probably readily scalable for trade-offs between security and efficiency, and so may thus be superior to Applicant's system—not to mention that Applicant's random number generator is only conjectured to be random.

Yet another idea pertaining to random number generation is that of composite generators in which the outputs of several generators are added together, say, to form a secure keystream. Statistically this appears to be a good idea, although composite generators have not been cryptoanalyzed to Applicant's knowledge. Reference M. Brown and H. Solomon, "On combining pseudorandom number generators", Ann. Statistics, Vol. 7, 1979, pages 691–695. Linear shift registers have also multiplexed together in various ways to form composites, e.g. with one generator used to select the output bit from another generator.

In 1973, the linear shift register generator using characteristic function $x^{607} + x^{334} + 1$ was shown to have "equidistribution and multidimensional uniformity properties vastly in excess of anything that has yet been shown for conventional congruentially generated sequences". Reference J.P.R Tootill and W.D. Robinson and D.J.Eagle, "An asymptotically random Tausworth Sequence", Journal of the Association for Computing Machinery, Vol. 20, 1973, pages 469–481. This generator has an astronomic period of $2^{607}-1$. The output is extracted from the full bitstream 23 bits at a time, and then skipping 489 bits, then repeating. The upshot of this is what Applicant calls "contraction", and goes back to 1965 when Tausworth first used a LSR as a generator. Although such jettisoning of bits does falls under the broad category of contraction, a more narrow view of contraction, in particular what the Applicant calls "amorphous contraction", requires an "amorphous" processing which reduces a set of bits to a smaller set in an often simple, but functional, manner.

The keystreams delivered by Applicant's invention will be seen to suitably be used as secret encryption keys, and are thus unsuitable for public key encryption. As an aside, it may be noted for the sake of completeness that public key encryption is a relatively new idea originating with Diffie and Hellman. Reference W. Diffie and M.E. Hellman, "New directions in cryptography", IEEE Trans. Information Theory, IT-22, Vol. 6, Nov. 1976, pages 644–654. Public key encryption is based on asymmetric algorithms. The idea is this. The receiver generates a random number which is then transformed into two keys: a public key and a private key. The public key is insecurely transmitted to the sender. The sender encodes the message with the public key and then insecurely transmits the cryptogram to the receiver. The receiver decodes the cryptogram using the private key. This system is practical provided that a) the problem of decoding the cryptogram with the public key is cryptographically intractable, b) deriving the private key from the public key is cryptographically intractable, c) the generation of the public and private keys is simple, d) encoding with the public key is simple, and e) decoding with the private key is simple.

The only practical public key system that has survived scrutiny is the patented RSA system invented by Rivest, Shamir, and Adleman in 1978. Reference R. Rivest, A. Shamir and L. Adleman, "A method of obtaining digital signatures and public-key cryptosystems", CACM, Vol. 21, No. 2, Feb. 1978, pages 120–128. The encryption formula is $C=E(Ks, M)=M^{Ks} \bmod N$. (The Micali-Schnorr random number generator is a RSA system.) Note that the security of even the DES is suspect. Reference John C. Dvorak, "Inside Track", PC Magazine, Vol. 11, No. 5, Mar. 17, 1992, page 95. Reference also BYTE magazine, May 1993, Vol. 18, No. 6 at page 130.

The Applicant, at various points, employs a permutator to resolve a "permutation selector" into a sequence of permuted indexes. The basic algorithm used follows one due to Moses and Oakford (reference L.E. Moses and R.V. Oakford, "Tables of Random Permutations", Stanford University Press, 1963) and to R. Durstenfeld (reference R. Durstenfeld, 1964, CACM, Vol 7, page 420). The method cited requires one multiplication per permuted index generated. A variant method based on division is reported by Knuth in his series "The Art of Computer Programming", specifically in "Volume 2: Seminumerical Algorithms", Addison-Wesley, second edition, 1981. This later method requires fewer bits in the permutation selector. An optimum permutation algorithm with respect to permutation selector size may be found in S. Even, "Algorithmic Combinatorics", Macmillan, 1973. Minimal selector size results when only the 1's bits of the data are "permutated" by considering only the combinations thereof, at the cost of increased computational complexity.

As a compromise between complexity and selector size, the Applicant has devised a new method based on "hashed division" which generates nearly uniform permutations with only a slightly larger permutation selector than the "division" method, while eliminating the need for multiplication and division.

SUMMARY OF THE INVENTION

The present invention contemplates the machine generation of cryptographic keys by non-linear, combinatorial, processes similar to processes that are normally associated with encryption of data.

1. The Utility of Amorphous Processes for Keystream Generation

The present invention deals with combinations of, and combinatorial processes performed on, the bits of a "seed" cryptographic key in order to produce a new, often larger and permissively much, much larger, cryptographic key, or "keystream", that is typically as, or more, cryptographically secure than is the "seed" cryptographic key itself. The combinatorial processes are typically recursive, and may typically be used to produce cryptographic keystreams of any desired length. The typically long output cryptographic key, or keystream, is usefully used to encrypt plain text, or to decrypt cipher text, data by any number of conventional cryptographic processes, including by a one time pad.

The combinatorial processes of the present invention are described as "amorphous", meaning that they are not the same from time to time, and over time. The amorphous processes, should the one in use at any particular instance not be known to a code breaker, present a great practical difficulty to a cryptoanalyst in discerning either (i) the "seed" key, or (ii) the amorphous process(es) operating thereon, from the output keystream. Of course, the output keystream is intended to be secret, and unavailable to the cryptoanalyst who typically has only cipher text data.

Accordingly, the strength of the present invention is that when a cryptographic "seed" key is itself "encrypted", and the is used to encrypt data, then (i) the problem of cryptoanalysis is magnified simultaneously that (ii) the utility of the key is enhanced. The cryptographic "seed" key must be so "encrypted" without destroying its functional utility as a cryptographic key. It is so "encrypted" by the combinatorial methods of the present invention. The utility of the key is enhanced because the combinatorial methods normally magnify the length, and thus the attendant utility, of the key.

2. The Nature of Amorphous Processes for Keystream Generation

The present invention deals with combinations. Specifically, the invention deals with taking a subset of bits from a set of (generally, substantially) random bits in some order. This combinatorial process is generalized to include subsets which contain multiple instances of bits from the set. The generalized combinatorial process, is called an "amorphous process"; the subset of bits produced by the amorphous process is called an "amorphous partition." Amorphous partitions also (generally) include logical complementing of selected bits. The term "amorphous partition index" (or "partition index" for short) refers to a particular partition given (i) a set and (ii) some partitioning scheme. The term "amorphous stream" refers to the subset output through a partition.

In order to illustrate these concepts, consider a set of 64 KB of random data, i.e. 524,288 random bits. Call this set a "seed", or "base" key. Base key partitioning, the "amorphous process" of the present invention, fall into three classes: expansion, equivocation, and contraction.

For expansion, the partition index has fewer bits than the amorphous stream. Say, for example, that the partitioning scheme is such that partition indexes are 3 KB and the subsets selected are 60 KB. Given an initial partition index (PI0), a 60 KB subset can thus be generated. The first 57 KB of this subset (amorphous stream) is output as a keystream component (KS1) with the remaining 3 KB used as the next partition index (PI1). Thus feedback yields the series KS1, KS2, ... which is defined as the keystream (KS).

For equivocation (loosely defined), the partition index is the same size as the amorphous stream. This critical case will produce no output (i.e. NULL={KS1, KS2, ...}) and thus is not a practical system in a feedback configuration.

For contraction, the partition index is larger than the amorphous stream. Amorphous contraction can be made practical by using an insecure keystream of sufficient length used as a sequence of partition indexes or possibly as a sequence of base keys also. E.g., the bitstream output of a linear congruential generator may be separated into a series of base keys and partition indexes. A process will also be called "contractive" if base key and partition index pairs are employed wherein the amorphous stream from each pair is smaller than the input, i.e. the base key and partition index pair input to the process. The conjecture of the present invention—supported by statistical tests—is that resulting "contracted randoms" output will be cryptographically secure.

To complete the description of the amorphous process, some base key bit order selection (the path) must be specified. Further, a XORing (substitution) component must also be described. The DESCRIPTION OF THE PREFERRED EMBODIMENTS section of this specification contains the details for several methods of path and substitution control, and the preferred structure of a keystream generators for implementing such path and substitution control.

3. Summary Descriptions of Expanding, and Contracting, Amorphous Process Keystream Generators of the Present Invention The present invention is embodied in a digital electronic machine for generating a cryptographic key by processes similar to those normally associated with encryption of plain text data. The machine includes 1) a base key source for providing a set of essentially random bits defined as a base cryptographic key, 2) a partition index source for providing an essentially random number called an amorphous partition index; and 3) an amorphous processor receiving the base key from the base key source means and the amorphous partition index from the random number source.

The 3) amorphous processor act to perform on the base key a generalized combination with substitutions in accordance with use of the amorphous partition index as a directive in order to produce another essentially random set of bits called an amorphous bitstream. In order to do so, the 3) amorphous processor includes 3.1) a selector for selecting from the base key in accordance with the amorphous partition index a selected set of bits, 3.2) a sequencer for sequentially ordering the selected set of bits in accordance with the amorphous partition index to produce an ordered selected set of bits, and 3.3) a logical complimenter for logically complementing the ordered selected set of bits in accordance with the amorphous partition index to produce a logically-complemented ordered selected set of bits called an amorphous bitstream.

By these elements, and these functions, a generalized combination with substitutions is performed on the base cryptographic key in accordance with the amorphous partition index. More particularly, the generalized combination with substitutions performed on the base cryptographic key—which base key is itself an essentially random set of bits—in accordance with the amorphous partition index—which partition index is itself an essentially random number—by the amorphous processor constitutes a process fairly describable as amorphous. This is exactly why the amorphous processor is called such, and is likewise why the set of bits produced by the amorphous processor is called an amorphous bitstream.

Clearly the amorphous process by which the base cryptographic key is used to produce the amorphous bitstream is, because it is a generalized combination with substitutions, itself in the nature of a cryptographic transform.

The amorphously-produced amorphous bitstream is usable as a cryptographic key likewise as is the base cryptographic key from which it is derived.

Notably, no order has been imparted to the cryptographic keystream by the amorphous transformation thereof. This is very useful—long keystreams may be generated from short, "seed", keys without imparting order during the process of keystream generation.

In greater detail, the 3.1) selector of the 3) amorphous processor of the machine permissibly selects from the base key, in accordance with the amorphous partition index, a subset of bits that includes multiple instances of bits of the base key set. The selected set permissively contains more bits than are within the base key.

Further in accordance with the present invention, a cryptograph (an "encryption means") may use the amorphous bitstream produced by the amorphous processor as a cryptographic key in a cryptographic transform.

The machine of the present invention generating an extended-length cryptographic key permissively still further includes 4) a feedback circuit, receiving the amorphous bitstream from the amorphous processor, for mapping the received amorphous bitstream into (i) a new amorphous partition index and (ii) a keystream portion, and for feeding back the new amorphous partition index to the amorphous processor for use therein and thereby; and 5) a recursive control means for repetitively cyclically exercising the amorphous processor and the feedback means so that, over a plurality of cycles, a plurality of amorphous bitstreams are produced by the amorphous processor and a plurality of keystream portions are produced by the feedback means. By these elements, and this operation, the amorphous processor recursively performs on the base key successive generalized combinations with substitutions in accordance with successive amorphous partition indices in order to produce a plurality of successive amorphous keystream portions. This plurality of successive amorphous keystream portions constitute, in aggregate, the extended-length cryptographic key.

Notably, this recursive amorphous process by which the base cryptographic key is used, in successive cycles, to produce the extended-length cryptographic key is, because it is still a generalized combination with substitutions, still itself in the nature of a cryptographic transform.

In still greater detail, the 4) amorphous processor typically includes a mapping circuit which expands a received amorphous partition index into an amorphous bitstream of a greater number of bits than are within the amorphous partition index. A feedback of the new amorphous partition index thus leaves one or more bits for the keystream portion. Because the amorphous process produces a number of bits beyond the partition index size, the amorphous process is called an expansion process and the amorphous processor is called an expanding amorphous processor.

The machine of the present invention generating an extended-length cryptographic key permissively still further includes 6) a random number source for providing a supply of essentially random numbers and 7) a cycle control means for repetitively exercising the amorphous processor and the random number source so that, over a plurality of cycles, a plurality of amorphous bitstreams are produced by the amorphous processor. The random number source provides for a new amorphous partition index for each cycle, or in addition, the random number source provides for a new base key for each cycle as well. The entire amorphous bitstream is used as a keystream portion; the plurality of successive amorphous keystream portions constituting, in aggregate, the extended-length cryptographic key.

In this embodiment of the machine in accordance with the present invention using the 6) random number source, the amorphous processor includes a mapping circuit which contracts a received amorphous partition index into an amorphous bitstream of fewer bits than the amorphous partition index. Accordingly, a source of amorphous partition indexes is necessary to produce a keystream. Moreover, because the amorphous process produces a number of bits fewer than the partition index size, the amorphous process is called a contracting process and the amorphous processor is called an contracting amorphous processor.

Of great importance, the 6) random number source may be based on a cryptographically insecure random number generator! The cryptographic security of the plurality of amorphous bitstreams, and of the cryptographic key, generated by the machine is achieved by the contraction process, and not by the "randomness" of the numbers generated by the random number generator!

A preferred random number source is an expanding amorphous processor in a feedback configuration. In this case the cryptographic security of the plurality of amorphous bitstreams, and of the cryptographic key, generated by the machine is achieved by the contraction process. Moreover, because the expanding amorphous processor of the random number source expands while the mapping means of the amorphous processor—which amorphous processor uses the random number as a new amorphous partition index and a new base key for each cycle—contracts, the entire process is called an amorphous teeter-totter process.

4. In Accordance with the Present Invention, Keystreams Can Also be Generated by the Method, and Apparatus, of a "State Machine"

The present invention further contemplates the keystream generation method, and apparatus, of a "state machine". The term "state machine" is used somewhat liberally here. Normally, a desired set of state transitions are first specified and are then transformed into a state machine. However, the opposite is done in the "state machine" of the present invention. In the present invention a "state machine" is specified in which the resulting state transitions are desired to be the series S1, S2, S3, ... until the machine begins repeating. In other words, the state machine method, and state machine, is simply a random number generator with an output series O1, O2, O3, used as the keystream.

Again, the idea of a "state machine" is to form a "function index" from the "state variable" and "machine index". This function index then is interpreted in a particular way to yield (i) a transition function and (ii) an output function. The state machine method can be viewed as an analog to the amorphous process described in preceding section 1. by interpreting the function index as the partition index, and viewing the transition and output mapping as an analog to the partitioning scheme.

In preferred operation, the state machine method takes as a key two values, a "machine index" and a "state variable". From these it amorphously forms a value called the "garbage index". This garbage index is decomposed into a plurality of fields which define, through a fairly involved process, a "transition function" and an "output function". The process includes the amorphous generation of operands which are then manipulated in a plurality of operations selected via the garbage index.

The "amorphousness" of the state machine, and the state machine method, lies in that operands and operations are selected via an expansion of the machine index and state variable wherein the expansion is intrinsically without form, and amorphous.

The conjectured cryptographic security of the state machine of the present invention results from the amorphous selection of both (i) the operands and (ii) the operations applied to the operands. It is respectfully suggested that this dual amorphism is a fairly powerful idea, and that it is likely to be exceedingly difficult for a cryptoanalyst to re-evolve the (i) key and/or (ii) the state machine from just the output keystream. Moreover, it should always be remembered that the output keystream itself is normally kept secret, and used to encrypt or decrypt data.

5. The State Machine In Accordance With the Present Invention Embodies At Least Two Ideas Promoting the Cryptographic Security of the Generated Key As introduced in section 4, above, the basic idea of the state machine method is to form the so-called "garbage index". The garbage index plays an analogous role to that of the partition index in the amorphous expansion and contraction methods briefly described in section 1. above. However, instead of defining an amorphous stream through a partition, a garbage index defines a next state variable and an output value (i.e. a keystream fragment) through a two functions: an output function and transition function.

The partition index specifies a function which selects bits from the base key. Analogously, the garbage index specifies a function (actually two) which selects bits from the machine index and state variable, although this is not a direct selection: a transformation is a more accurate description.

A first idea expressed in the preferred embodiment of method, and the state machine, of the present invention is to interpret the so-called "garbage index" as a collection of fields. Some fields specify operands, others specify operations, still others specify the order of operations and operands, still others specify the expansion of fields, and/or still others do all sorts of strange things. Some of the strange things possible are described in the DESCRIPTION OF THE PREFERRED EMBODIMENTS section of this specification.

Once operands are formed and operations selected, the results from these operations provide values which can be treated as additional operands. Further fields from the garbage index can now provide more "operation indexes" to further transform the result operands. Many levels of operations can be performed before a final result is obtained. The total of such intermediary operations defines an output or transition function, though these functions could share some, or most (as in the preferred embodiment) of the intermediary operations.

Another, second, major idea expressed in the preferred embodiment of the method, and the state machine, of the present invention is the use of dependency bits. These dependency bits serve provide a pool of random bits used in such things as field expansion or operand formation. A dependency table could be generated by an amorphous process using the machine index and state variable directly as a base key and partition index. However, this requires that the state variable and particularly the machine index be random values; an undesirable constraint necessary for generation of a fairly random dependency table. To circumvent this problem, the preferred embodiment uses the machine index and state variable to form seed(s) for use in a conventional random generator(s) such as a congruential multiplier. The random output is then amorphously compressed to form a dependency table which is not only random regardless of the input, but also securely derived.

6. Summary Description of a State Machine Keystream Generator in Accordance With the Present Invention In accordance with still another embodiment of the present invention, a state machine serves to generate an extended-length cryptographic key by non-linear processes that are normally associated with encryption of plain text data. The state machine operates to transform a state variable into an keystream fragment and a next state variable in accordance with a directive called a machine index.

A preferred embodiment of the state machine includes a dependency formation circuit for generating a plurality of random bits from the machine index and state variable. These dependency bits serve as dependent parameters for subsequent operations. The dependency formation circuit consists of, for example, a congruential multiplier random generator.

Further included is a garbage index formation circuit for deriving from the machine index, the state variable, and the dependency bits a garbage index. The garbage index formation circuit may consists, for example, a streaming CEM.

A parsing means decomposes the garbage index into a plurality of fields which provide for a transition function and an output function.

A field expansion means explodes certain fields. The field expansion circuit may so operate, for example, by injecting dependency bits into the fields at points selected by a dispersed emission stream of dependency bits.

An evaluation means interprets the fields of the transition function and output function as directives so as to perform selected operations on selected operands. The selected operations on the formed operands producing intermediary results which are used as operands for still additional operations that are selected with additional fields. The evaluation process terminates after a predetermined number of levels, producing a final result.

A state transition permits the process to continue.

A plurality of keystream fragments result.

A concatenation of successive keystream fragments is defined as the keystream.

7. Summary Statement of Merit of the Present Invention

The expanding amorphous process of the present invention is functionally and computationally simple. The amorphous processes of the present invention may be dramatically contrasted with the conventional wisdom of "small key" systems which attempt to get the most "mileage" possible out of a small key. The existing small key paradigm holds that larger key systems should be formed by combining the analyzed components of small key processes.

The expanding amorphous process of the present invention is almost the complete opposite to prior cryptographic key generation and key management systems. The present invention starts with a large key and then uses the simplest possible, almost trivial, operations to form a secure keystream. Instead of optimizing the "miles per gallon" of a small key, the expanding amorphous process of the present invention taps into a virtually infinite supply of possibilities and "inefficiently" converts these possibilities into the reality of a keystream—a keystream that is effectively distinct from the large key from which it was derived!

From an analytic, and also a philosophic, viewpoint, the expanding amorphous process of the present invention is arguably quite appealing: it exploits the infinite via the simple. The method's merit results from avoiding the "complexity" which historically has proven to be, all too often, less than effective.

The difference between the approach of the present invention and prior approaches to cryptology boils down to the use of, and the reliance upon, a complexity which is disperse versus a complexity which is dense. The merit of the disperse complexity of the present invention is in its clarity. Contrast the dense complexity of prior art small key systems: which complexity is problematic in that the complexity of such systems may be illusionary.

The expanding amorphous process of the present invention is, with all its disperse complexity (which is actually its simplicity), arguably more attractive then prior art small key systems based on dense complexity in that a sufficiently complete analysis of the cryptographic security of the process of the present invention is not only possible, it is highly believable that such an analysis is indeed thorough! As previously explained in the BACKGROUND OF THE INVENTION section, the cryptographic security of small key (dense complexity) systems depends strongly on the intractability of obtaining any reverse solution to the mathematical algorithm upon which the key generation is based.

While the expanding amorphous process of the present invention has the drawback of having a large storage requirement for keys, this liability can be mitigated significantly by expanding a small seed key into the much larger base key only when needed. Furthermore, an expanding amorphous processor in accordance with the present invention—although simple and straightforward in the data manipulations that it performs—is generally larger, and requires more silicon real estate, than would, for example, a Data Encryption Standard (DES) chip. Again, this is not a prohibitive factor considering that the price per transistor of integrated circuitry is already low, and is seemingly spiraling downward.

A strong case can be made that the small key paradigm of the prior art is an anachronism which emerged from the pencil and paper era of encryption. In an era of integrated circuits, it can be asserted that the large key expanding amorphous process of the present invention is indeed pound wise and yet penny frugal.

The merits of the contracting amorphous process of the present invention are similar to the merits of the expanding process because the contracting case is simply another mode of the amorphous process.

The state machine, and state machine method, of the present invention is probably the least attractive of the three machines, and three methods, of the invention. However, the state machine is still interesting because it is in essence a combination of the expanding and contracting amorphous processors. Or in other words, the state machine is a complex version of the amorphous teeter-totter. This teeter-totter action results from the expansion and contraction which occurs at each transition. Since the amorphousness of both operations is high, the resulting random output should be secure, and was empirically found to be highly random.

These and other aspects and attributes of the invention will become increasingly clear upon reference to the following drawings and accompanying specification.

DESCRIPTION OF THE PREFERRED EMBODIMENTS

1. Amorphous Processes for Keystream Generation

Figure 1:
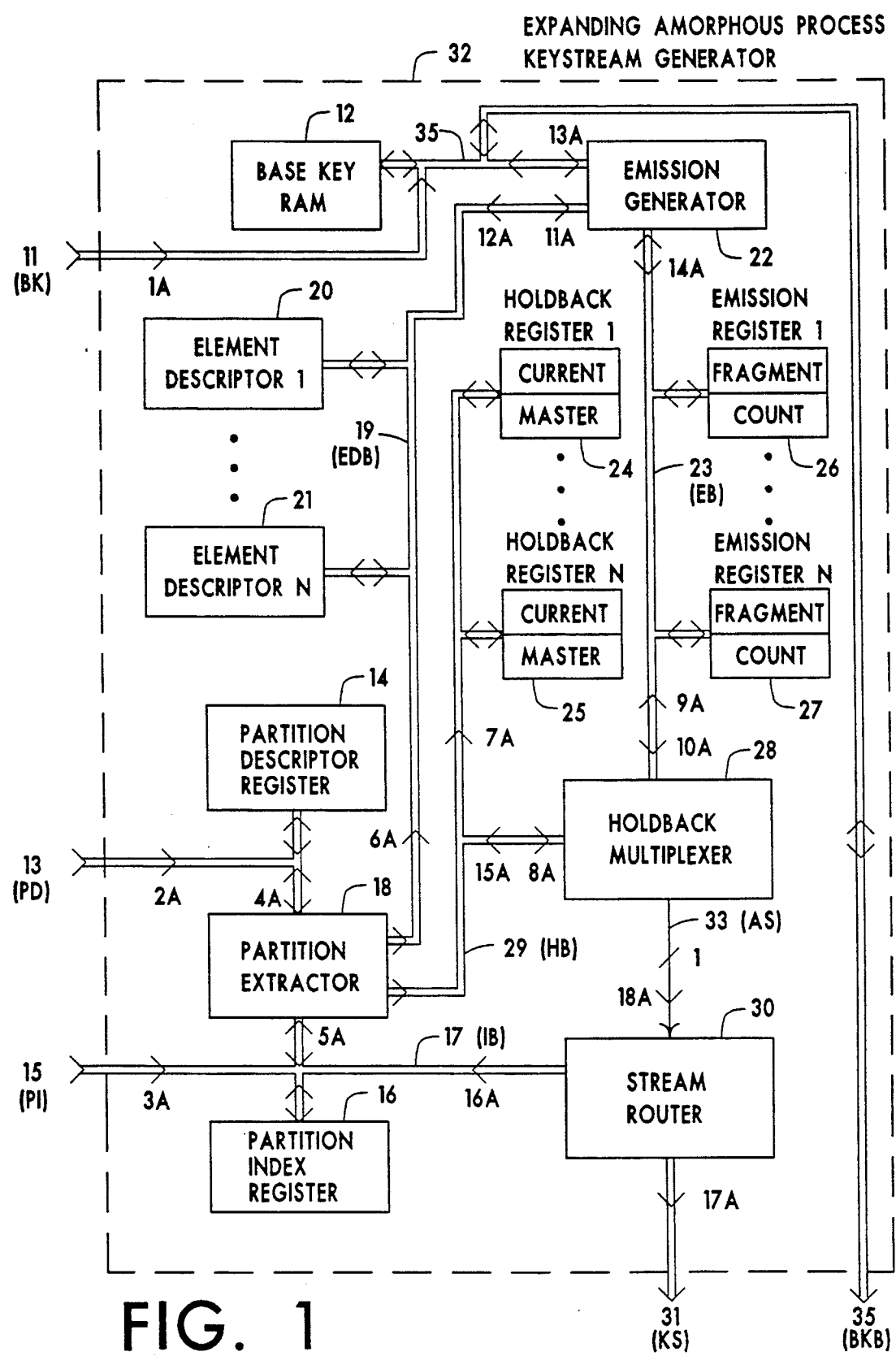
FIG. 1 is a block diagram of a keystream generator using an expanding amorphous process in a feedback configuration.

The keystream generators of the present invention in their various forms have, as their primary principle of operation, the concept of performing an "amorphous process". Accordingly, it is immediately appropriate to first explain more exactly what an "amorphous process" is.

An "amorphous process" consists of applying a "partition" to a large random "base key". A "base key" is a set of bits. A "partition" is a selection of certain base key bits, with some bits possibly selected more than once and with other bits possibly not selected at all, and with none, some, or all of the selected bits being logically complemented. Or in other words, a "partition" is a permuted generalized combination with substitutions.

The bits selected via some partition form a sequence called an "amorphous stream". A "partition index" is value which specifies a partition under some partitioning method, i.e. a "partition index" fully specifies how the amorphous stream is to be selected from the base key.

The amorphous process is conveniently divided into three classes. An "expanding" amorphous process results from a partitioning method in which the partition indexes are smaller than the amorphous streams produced. A "contracting" amorphous process results when the partition indexes are larger than the amorphous streams produced. And finally, an "equivocation" process is one with the same size of indexes as the amorphous streams. This last critical point case is still called equivocation even if a particular partitioning method is not tight enough to provide for true equivocation in the sense defined by Shannon. The limits of the ratios of amorphous expansion or contraction are both infinite, though in practice a finite ratio must be used to construct a practical system.

To implement the "key extension" method of the present invention, an expanding amorphous process is used to generate a keystream from a given initial partition index. The amorphous stream from the initial partition index will provide a "next" partition index with the excess bits used as part of the keystream. Continuing with successive partitions results in the generation of a keystream.

To implement the "contracted randoms" method of the present invention, a contracting amorphous process is applied to the output of some pseudo random number generator to produce a more secure keystream. Additional security is achieved since amorphous contraction will hide the underlying method of random number generation. Alternatively, a contracting process could follow an expanding process thus eliminating mathematical random number generation entirely. This configuration of expansion followed by contraction is called the "amorphous teeter-totter".

To better understand the amorphous process, consider an expanding process consisting solely of transpositions. The base key is first divided into a plurality of contiguous items called elements. For a given element of, for example, 1024 bits, the number of possible paths therein is a very, very, large number, with the actual value being 1024!. Since expansion is desired, a much smaller set of all paths must be selected. Furthermore, these paths should be simple with respects to transition complexity and the number of internal values necessary to represent any point in the path. One adequate class of paths which requires only two internal values is the FRONTs and TAILs method. Here, the path "FT" denotes the sequence F1, T1, F2, T2, F3, T3, etc where F1 is the first bit of the element, F2 is the second bit, and so on, and where T1 is the last bit, T2 is the second to the last bits, and so on. The sequence of bits from an element selected by a path is called an "element emission".

The FRONTs and TAILs method give rise to paths such as {F, T, FT, FFT, FFTT}, with each path defining a different element emission. To form the amorphous stream for a given partition, all of the element emissions must be multiplexed together in some manner. While these emissions could simply be taken one after the other in some permuted order as was done with transposition block ciphers, a better multiplexing method should be employed to complicate correlating an amorphous stream with the base key.

One such better method which is sufficiently simple is the holdback multiplexer which views all the elements as a permuted set but forms the amorphous stream by taking one bit at a time from successive element emissions in their permuted order. In addition, each element is associated with a holdback count which is decremented each time the multiplexer outputs a bit from that element emission. When the holdback count reaches zero, the pending bit in the element emission is "held back" at that point with the multiplexer continuing with the next element emission. The holdback counter is reset to some fixed value with the "held back" bit output during the next pass.

Substitution can readily be included in the above partitioning method. Let Fc denote the logical complement of a "front bit" and similarly Tc for tail bits. Now the set of paths could become {F, Fc, T, Tc, FT, FcT, Ftc, FcTc}. Annihilation can also be readily included by interpreting some of the leading bits in each element as a "hole" which are excluded from the element emissions.

The details of mapping partition indexes to partitions will be given in greater detail shortly below; however, it should be fairly clear how this could be done. Of note, finer and finer partitions can be made until a contracting process is reached. Furthermore, by using larger and larger number of bits to select the permutation of elements (this can be done in a very general way), any contraction ratio desired can be readily obtained. Other partitioning methods and generalization will be also be described in this section below.

The key extension method of generating a keystream is now described, as depicted by expanding amorphous process keystream generator 32 of FIG. 1. An initial partition index 15 is sent to partition index register 16, a partition descriptor 13 is sent to partition descriptor register 14, and a base key 11 is sent to base key ram 12. With the processor thus initialized, the first partition is then carved. Partition extractor 18 receives a partition index from partition index register 16 and a partition descriptor from partition descriptor register 14. Partition extractor 18 then carves a partition with respects to base key ram 12 and stores the partition information in the following registers: element descriptor one (1) 20 through element descriptor N 21, holdback register one (1) 24 through holdback register N 25, and several internal registers within holdback multiplexer 28.

After the partition information is stored, control is passed from partition extractor 18 to holdback multiplexer 28. Holdback multiplexer 28 first zeros the count field in emission register one (1) 26 through emission register N 27. Holdback multiplexer 28 then generates amorphous stream 33 which is sent to stream router 30. The details of this generation process are described shortly below. Stream router 30 first passes received amorphous stream 33 into a next partition index stored in partition index register 16. The remainder of amorphous stream 33 is passed as keystream 31.

Once amorphous stream 33 is completely generated, control is returned from holdback multiplexer 28 to partition extractor 18, which proceeds to carve a new partition with the new partition index just generated. Utilizing feedback as described, this process repeats resulting in a keystream 31 of desired length, quite possibly very long.

Figure 2:
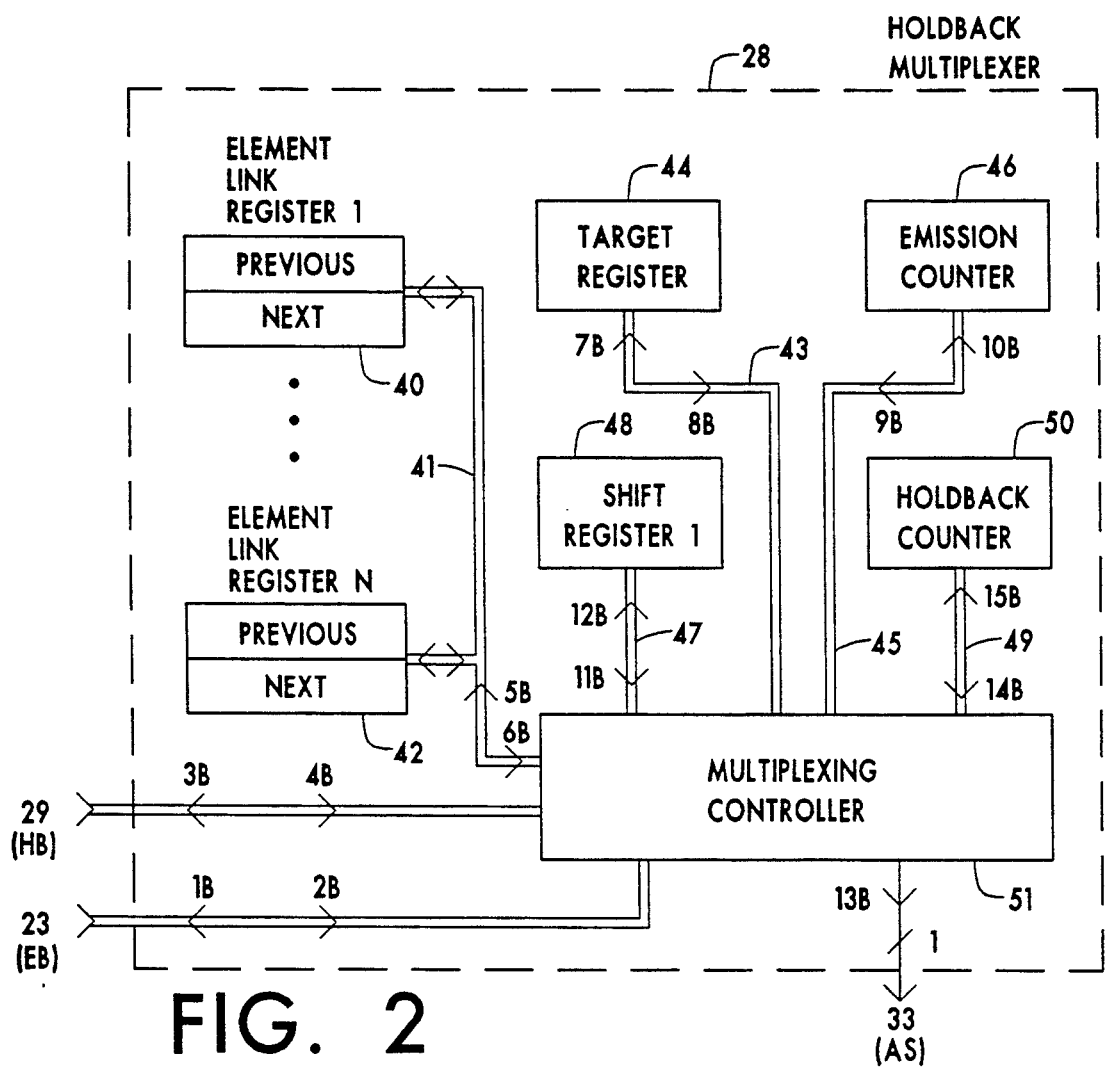
FIG. 2 is a block diagram of the holdback multiplexer used to form an amorphous stream for the expanding process of FIG. 1.

The operational details of holdback multiplexer 28 are now described. FIG. 2 depicts the internal structure of the multiplexer. First, the emission count reset stage. Multiplexing controller 51 initializes emission counter 46 with the maximum number of elements. Multiplexing controller 51 then successively zeros the count field in emission register N 27 through emission register one (1) 26 using emission counter 46 to address the emission registers. Emission counter 46 is decremented at each cycle until the counter reaches zero, which means that all the emission count registers have been reset.

The generation of amorphous stream 33 by multiplexing controller 51 is described next. The usual case for generating an amorphous bit is described first, with the various sub-cases described thereafter.

Target register 44 is read to provide for a target element. Target register 44 selects an emission count register (26-27) whose value is read and stored in emission counter 46. Emission counter 46 is then decremented. Target register 44 also selects a current holdback register (24-25) whose value is read and stored in holdback counter 50. Holdback counter 50 is then decremented. Target register 44 further selects an emission fragment register (26-27) whose value is read and stored in shift register one (1) 48. Multiplexing controller 51 pulses shift register one (1) 48 to obtain a bit which is sent as the next part of amorphous stream 33.

The selected emission fragment register (26-27) is updated by writing to it the modified contents of shift register one (1) 48 via emission bus 23. The selected current holdback register (24-25) is also updated by writing to it the modified contents of holdback counter 50 via holdback bus 29. Further, the selected emission count register (26-27) is updated by writing to it the modified contents of emission counter 46. Finally, target register 44 is updated by storing to it the value of the next field of the element link register (40-42) selected by the target register.

Now for the sub-cases. If the value read from the selected emission count register (26-27) is zero, then multiplexing controller 51 sends a emission refill request (and the contents of target register 44) via emission bus 23 to emission generator 22. Emission generator 22 gains control and refills the selected emission register (26-27). Emission Generator 22 returns control by sending an emission refilled signal to multiplexing controller 51, multiplexing then continues with the same element.

If holdback counter 50 is zero upon being decremented, a holdback occurs. Multiplexing controller 51 then reads the master field of the holdback register (24–25) selected by target register 44 with the master value written back to current field of selected holdback register. Multiplexing continues at the update point for target register 44.

If a refill request to emission generator 22 cannot be satisfied, i.e. when the selected element's emission is exhausted, then control is returned immediately by sending an element exhausted signal to multiplexing controller 51. The exhausted target element is "deleted" by unlinking the element selected by target register 44 from the doubly linked list of element link register one (1) 40 through element link register N 42 by modifying the proper registers therein. Target register 44 is also advanced. If another element exists, the multiplexing continues. If, however, the deleted element was the last element, multiplexing controller 51 returns control to partition extractor 18 by sending an emissions exhausted signal via holdback bus 29.

Holdback multiplexer 28 could be enhanced in the following manner to emit a plurality of bits at each element stage. To this end, each element specifier would include a cycle list specification with the multiplexer now employing an array of registers to hold the cycle lists. (Alternatively, a global cycle list could be used to keep the size of partition indexes small.) Consider the cycle list of {3, 1, 2, 1}. The multiplexer would cyclically access this list. The first modifier of 3 would cause three successive emission bits (instead of one) to be emitted into the amorphous stream during that element emission multiplexing stage, then 1 bit, then 2 bits, and then 1 bit (then repeat) emissions on the successive concatenating phases for that element emission.

Another enhancement for holdback multiplexer 28 would be to employ a plurality of element permutations with each permutation associated with a chain. Each chain would require an additional array of element link registers to hold its permutation. Here, the multiplexing would proceed as before starting with the first chain but only processing elements until the starting link of that chain is reached. Then the next chain would be processed until all its elements are swept once, and then so on. Once all chains are swept, processing would begin again with the first chain. This "chained" generalized multiplexer requires more memory in the form of element link registers, but its operation is only slightly more complex.

Another multiplexing enhancement would be to terminate the partition once the number of remaining elements reaches some threshold. This aborting is desirable in order to thwart the possibility of correlating the base key with the trailing portion of an amorphous stream. Without this truncation, the trailing portion would contain multiplexed bits from too few elements thus making that portion cryptographically weak. This truncation can be done with only a minimal loss of amorphous stream.

Another multiplexing enhancement would be to employ independent current/master holdback registers in conjunction with "chained" multiplexing. Or in addition, independent element descriptors and emission fragment/count registers could be used resulting in the multiplexing of a plurality of independent partitions. Though this would require vast more memory and also reduce the generation efficiency since the expansion would be significantly decreased because of the additional bits required to define the various partitions.

The operational details of partition extractor 18 of FIG. 1 are now described for path picking partitions based on the FRONTS and TAILS method. See also FIG. 3 for a depiction of the corresponding (path picking) emission generator 22a. Dispersed partitions, alternatively, can be employed. Dispersed partitions will be described at a later point.

Without loss of generality a 64 KB (KB=kilo bytes) base key RAM 12 will be partitioned using 26,113-bit partition indexes. Each partition index is composed of a 4,097-bit permutation selector and 512 43-bit partition element specifiers. The partition element specifiers, taken one after the other, carve the KB base key into 512 contiguous partition elements in a manner yet to be described. The permutation selector is applied to a (hashed division) permutator with N=512, yielding a permutation on the partition elements. It is this permutation information, formatted for a doubly linked list, which is sent from partition extractor 18 to holdback multiplexer 28 for storage in element link register one (1) 40 through element link register N 42.

The following table shows a typical partition of the leading and trailing elements, carved using consecutive partition element specifiers but numbered with the permuted indexes. The 512 contiguous partition elements span exactly the 64 KB base key 12.

TABLE I

| ELEMENTS | BIT SIZE |
|---|---|
| E35 | 910 |
| E219 | 1075 |
| E74 | 1384 |
| E90 | 575 |
| E412 | 1122 |
| . | . |
| . | . |
| . | . |
| E19 | 1501 |
| E315 | 1101 |
| E59 | 1192 |
| E500 | 1520 |
| E9 | 535 |

The seven fields which comprise each 43-bit partition element specifier are shown in the table below. The use of these specification fields will be described in due order.

TABLE II

| FIELD NAME | SIZE |
|---|---|
| size specification | 10 bits |
| hole specification | 5 bits |
| master holdback specification | 4 bits |
| initial holdback specification | 4 bits |
| initial item specification | 10 bits |
| path picking specification | 5 bits |
| truncate specification | 5 bits |

The size specification is used to select the number of bits in a given partition element. The formula used is SIZE=512+size specification. This results in elements ranging from 512 to 1535 bits with an average size of about 1024 bits. Handling partition indexes which request more bits or less bits than the base key are handled by dropping some elements if necessary and adjusting the size of the last element to the remaining number of bits.

The hole specification selects the number of leading bits (0 to 31) in a given partition element which are not emitted. Only those bits beyond the hole are emitted through path picking. The path picking specification selects the order and polarity in which the non-hole partition element bits are emitted. Each "substitutive" path is a list containing one or more bit emitter controllers. The possible controllers are F (emit a front), Fc (emit a front as complemented), T (emit a tail), and Tc (emit a tail as complemented). The non-hole bits selected by a path form a sequence called the element output. The following table defines the path for a given picking path specification (which ranges from 0 to 31):

TABLE III

| INDEX | PATH |
|---|---|
| 0 | F |
| 1 | T |
| 2 | Fc |
| 3 | Tc |
| 4 | F, T |
| 5 | Fc, T |
| 6 | F, Tc |
| 7 | Fc, Tc |
| 8 | F, F, T |
| 9 | Fc, F, T |
| 10 | F, Fc, T |
| 11 | Fc, Fc, T |
| 12 | F, F, Tc |
| 13 | Fc, F, Tc |
| 14 | F, Fc, Tc |
| 15 | Fc, Fc, Tc |
| 16 | F, T, T |
| 17 | Fc, T, T |
| 18 | F, Tc, T |
| 19 | Fc, Tc, T |
| 20 | F, T, Tc |
| 21 | Fc, T, Tc |
| 22 | F, Tc, Tc |
| 23 | Fc, Tc, Tc |
| 24 | F, F, T, T |
| 25 | Fc, F, T, T |
| 26 | F, Fc, T, T |
| 27 | Fc, Fc, T, T |
| 28 | F, F, Tc, T |
| 29 | Fc, F, Tc, T |
| 30 | F, Fc, Tc, T |
| 31 | Fc, Fc, Tc, T |

The element output sequence is rotated (to the right) by INITIAL positions, where the INITIAL=integer( (initial item specification * number of non-hole bits)/1024). This sequence is now truncated (from the left) by the value of the truncation specification which ranges from 0 to 31 bits. The resulting sequence is the "element emission".

The remaining partition element specifier fields, the master holdback specification and the initial holdback specification, are used in forming holdback values which are stored in holdback register one (1) 24 through holdback register N 25. The current holdback formation formula is current holdback=initial holdback specification +1, with values ranging from 1 to 17. For master holdbacks, the formula is master holdback master holdback specification +7, with values ranging form 7 to 23.

The holdback multiplexing scheme was chosen to weave the element emissions together in a manner which exasperates the problem of resolving the partition index from the keystream. Without holdbacks, taking every 512th keystream bit would yield some element emission which could be used to eventually extract the base key. Holdbacks introduce into the extraction of element emissions an uncertainty which results in a large list of emission candidates, with the subset of the most probable emissions quite large in itself. (See Appendix 4 for an analysis.)

The preceding description of element emission formation was intended as an abstract. In practice, the element parameters such as SIZE and INITIAL are transformed into parameters which lend themselves to a more practical formation of element emissions. It is these "practical" parameters which are stored in element descriptor one (1) 20 and element descriptor N 21.

Figure 3:
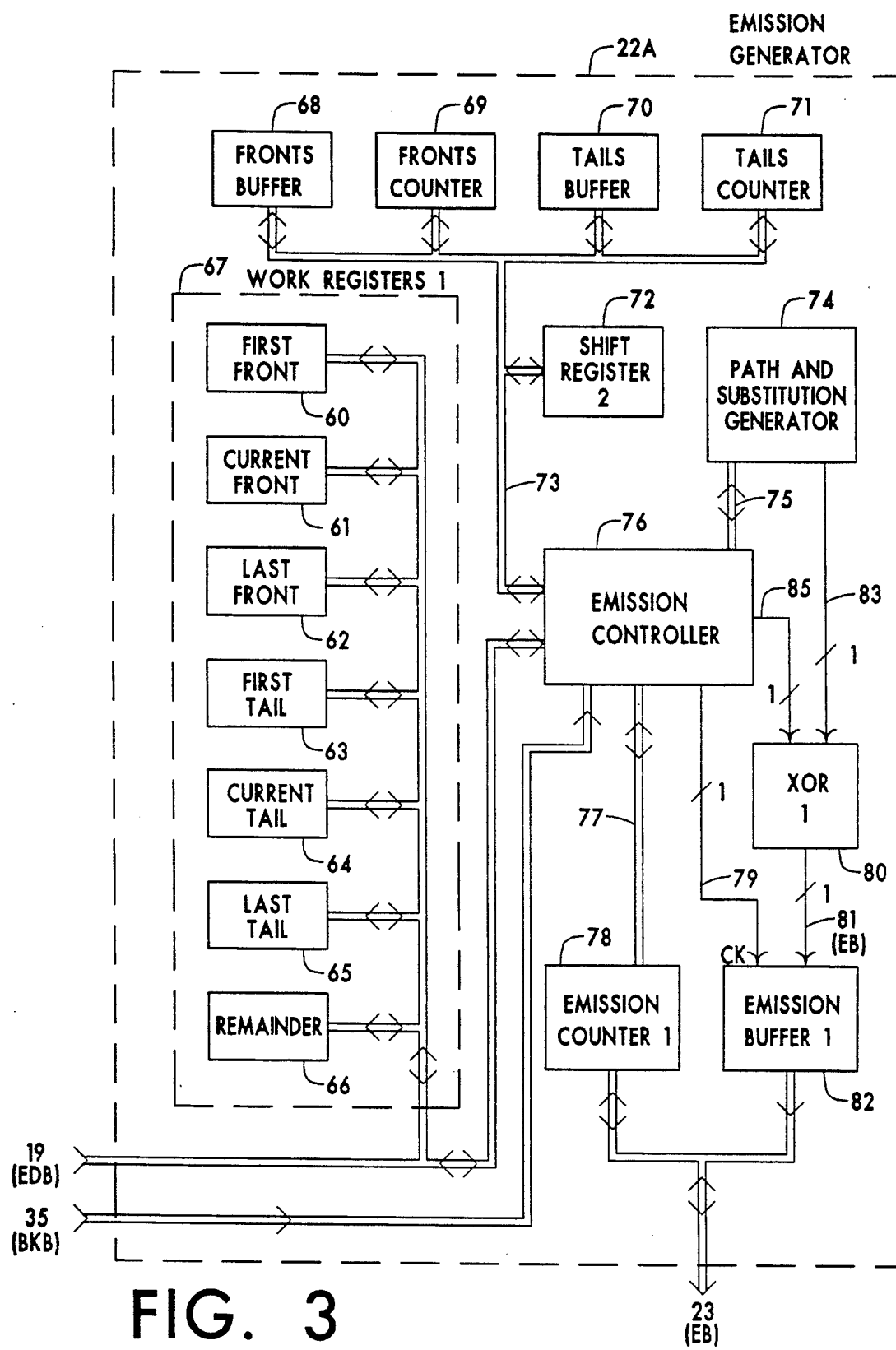
FIG. 3 is a block diagram of an emission generator used to form element emissions which are then multiplexed in the expanding process of FIG. 1.

FIG. 3 depicts (path picking) emission generator 22a which uses these "practical" parameters to generate element emissions. These parameters are labeled as work registers one (1) 67. A further parameter is internally used by path and substitution generator 74. The contents of work registers one (1) 67 are somewhat self-explanatory. More specifically, current front 61 holds the bit address of the next FRONT bit to emit of the element in base key ram 12. Likewise, first front 60 points to the first FRONT bit of the element and last front 62 points to the last FRONT bit. The tail registers of first tail 63, current tail 64, and last tail 65 are defined as expected. Remainder 66 holds the count of the remaining emission bits.

The evaluation of element descriptor values from the SIZE and INITIAL parameters is straight forward. E.g., the first front value is derived by adding the hold size to the next element address. The path specification yields the proportion of FRONTs to TAILs, together with the SIZE, yields a value for the last front. The first tail is simply the successor of the last front (the first tail register could be eliminated from the element descriptors and computed on demand instead). The last tail is derived by considering the SIZE parameter and the element's starting address. The current front and tail values are derived by considering the INITIAL parameter and the path specification. The remainder value is simply the non-hole size minus the truncated bits.

Emission generator 22a operates as follows. Upon receiving an emission refill request from holdback multiplexer 28 via emission bus 23 (and through emission counter one (1) 78), emission controller 76 loads work registers one (1) 67 with the contents of the element descriptor (20-21) selected by target register 44. Path and substitution generator 74 is also loaded with a parameter from the selected element descriptor. Emission controller 76 checks if work register remainder 66 is zero, if so, the refill request is terminated by sending to holdback multiplexer 28 an element exhausted signal.

To fill fronts buffer 68 and fronts counter 69, shift register two (2) 72 is first loaded with the word from base key ram 12 containing the bit selected by current front 61 (address of this word is current front 61 shifted right by say 4 bits for a word size of 16 bits). Emission controller 76 pulses shift register two (2) 72 by a number (determined by the lower bits of current front 61) so that the first bit in shift register two (2) 72 is the current front bit. Emission controller 76 then stores the contents of shift register two (2) 72 in fronts buffer 68. To compute the number of valid bits in fronts buffer 68, emission controller 76 subtracts from the word size the number of pulses needed to right justify the current front bit. This value is then bounded by the fronts bits available (the difference between the last front 62 and current front 61 plus 1) and stored in fronts counter 69.

By a similar process, emission controller 76 fills tails buffer 70 and tails counter 71 with values derived from current tail 64, first tail 63 and base key 12.

Emission controller 76 resets emission counter one (1) 78 to zero and then begins to generate emission bits. First, emission controller 76 requests and receives from path and substitution generator 74 a path selection bit. The path selection bit selects either a fronts bit (if 0) or a tails bit (else if 1). When a front bit is selected, emission controller 76 pulses and receives from fronts buffer 68 the next fronts bit, similarly, tails buffer 70 is accessed whenever a tails bit is selected. The element bit 85 generated is sent to XOR one (1) 80. Next, emission controller 76 requests from path and substitution generator 74 a substitution bit which is sent along 83 to XOR one (1) 80. The output of XOR one (1) 80 is an emission bit which is sent along 81 to emission buffer one (1) 82. Emission buffer one (1) 82 is pulsed via clock 79 and the emission bit is loaded.

The bit address in the associated work register, either current front 61 or current tail 64, is then advanced by emission controller 76. A front is advanced by incrementing current front 61, and if the new value is beyond last front 62, first front 60 is then stored in current front 61. A tail is advanced by decrementing current tail 64, and if the new value is before first tail 63, last tail 65 is then stored in current tail 64.

The associated element counter, i.e. either front counter 69 or tails counter 71, is decremented. If the associated element counter is now zero, the associated buffer and counter are refilled by the procedure described above.

Emission controller 76 pulses emission counter one (1) 78 to accrue for the loaded emission bit. Work register remainder 66 is then decremented. If remainder 66 is now zero or if emission buffer one (1) 82 is full (detected by checking the contents of emission counter one (1) 78), the emission generation terminates, else, another emission bit is generated.

Upon emission generation termination, emission controller 76 pulses emission buffer one (1) 82 to right justify the content (by a number derived form emission counter one (1) 78 and the emission fragment word size). The contents of emission counter one (1) 78 and emission buffer one (1) 82 are stored in the selected emission register (26-27) as count and fragment values. The contents of the modified work registers one (1) 67 and the internal register(s) of path and substitution generator 74 are stored in the element descriptor (20-21) selected by target register 44. Finally, emission controller 76 returns control to holdback multiplexer 28 by sending an emission refilled signal on emission bus 23.

The path picking specification is mapped by TABLE III to 32 different substitutive paths. This scheme was chosen for partition index compactness and for software implementation performance in that this small finite set of paths can readily be hard coded for optimum throughput. A hardware implementation of path and substitution generator 74 could employ two linear shift registers with direct feedback, one for the path and one for the substitution generation.

The path based amorphous partition method lends itself to innumerable extensions. E.g. the path and substitution generator 74 could employ maximal length LSRs to generate the path and substitution bits. However, this has the drawback of requiring larger partition indexes if each element uses independent LSR datum and tap information. Though this ballooning of the partition index could be greatly reduced by using a single maximal length LSR (only 607 specification bits would be needed for the one investigated by Tootill, Robison, and Eagle) for the generation of both the path and substitution bits, wherein this LSR would be used globally for all elements. Alternatively, a compound maximal length LSR configuration, say a STOP-N-GO generator, could be used to generate the path and substitution bits. More complex generation schemes, say DES in a feedback mode or the RSA method of Micali and Schnorr, could be used. However, this additional complexity is unnecessary and would degrade performance. Note that since the proportion of fronts to tails would not be exactly known a priori (when using a maximal length LSR, etc), the last front bit address evaluation should assume a uniform 50/50 distribution of 1's and 0's for the path and substitution bits wherein extra front or extra tail bits would be emitted if the distribution as not exactly uniform.

Another partitioning extension would be to include a 5-bit delta elements field in partition indexes. Using the formula COUNT=512−delta elements would result in partitions ranging from 481 to 512 elements. This extension would require simple modifications such as fix-ups to the SIZE formula and the handling of partition indexes whose lengths now depend on the delta elements value.

Another partitioning extension would be to include a 10-bit rotate field in partition indexes. This rotate field would select the first unpermuted element's starting bit from the 1st to 1024th bit of the base key, thus eliminating the knowledge of the initial elements edge. The last unpermuted element would now contain the "wrapped" bits from the front of the base key. Note that additional registers would now be needed to parameterize the wrapped element.

Another partitioning extension would be to expand the path picking table. To this end, another hole specification field and a section differential specification field are included in the partition element specifiers. This results in an enhanced partition element with the new hole separating the element into two sections, the size of the sections determined by the section differential specification. This now yields two sets of fronts and tails. The emitter controller alphabet would become {Fa, Fac, Ta, Tac, Fb, Fbc, Tb, Tbc} so that much large path tables are now possible while keeping the path list length still relatively short.

Another partitioning extension would be to permit (at least some) overlapping elements so that several base key bits are multiply emitted. Overlapping elements are useful for increasing the expansion ratio. A larger dynamic range of partition elements also makes the keystream more secure from base key extraction attacks.

Another partitioning extension would be to employ a logical base key defined using a logical mapping field within a partition index. Here a partition would be carved on the logical base key. The logical mapping field consists of 1024 (twice the number of elements to be carved) logical specifiers plus a logical permutation selector. The logical specifiers consist of a block size specification field and possibly a block hole specification field. The blocks (excluding any hole bits) thus carved and permuted are then viewed as a contiguous area, the logical base key. The elements subsequently carved from the logical base key would then require translations into the actual base key, or alternately, the logical base key could be created in memory and then directly used. Using twice as many blocks as elements results in element emissions which typically span two (or three) different areas in the base key, thus complicating a correlation attack.

Another class of partitioning extensions would be to employ feedback within a partition. A simple example is to include a trigger field within partition indexes to select how many amorphous bits are emitted before triggering. Once triggered, a fixed portion of the following amorphous stream would be intercepted and buffered. These intercepted bits could be used to either replace or modify all or some portion of the current holdback values and master holdback values.

One feedback configuration which is particularly attractive is to break the base key into two 32 KB areas. A first amorphous process using the first base key area is seeded with a partition index and generates a keystream as before. However, now, the keystream of the first is feed as partition indexes to an amorphous process using the second base key area. The resulting amorphous streams from the second process are now output as the generated keystream, with no feedback in the second process.

The operational details of partition extractor 18 of FIG. 1 are now described for dispersed partitions based on the skippers method. See also FIG. 4 for a depiction of the corresponding (dispersed) emission generator 22b. Again, a 64 KB base key will be partitioned but here with a (dispersed) partition index 15 ranging from 16,576 to 34,432 bits. Each partition index is composed of 64 dispersed element specifiers and a list of skippers with each skipper being a byte value. The list of skippers is further divided into 64 contiguous groups with each group linked to exactly one dispersed element specifier. The following table defines the format of the dispersed element specifiers which range in size from 59 to 90 bits:

TABLE IV

| FIELD NAME | SIZE |
| --- | --- |
| start point specification | 19 bits |
| skip cycles specification | 5 bits |
| next delta specification | 5 bits |
| master holdback specification | 4 bits |
| initial holdback specification | 4 bits |
| xor cycles specification | 5 bits |
| xor datum specification | 17–48 bits |

The start point specification selects the starting bit which is some bit in base key ram 12 (19 bits spans 64 KB exactly). The skip cycles specification selects how many 1-byte skippers are in its group of skippers using the formula COUNT=skip cycles specification +25, thus yielding 25 to 56 skippers. The next delta specification selects the number of bits to be added (formula is NEXT=next delta specification+1, hence NEXT ranges from 1 to 32) to the starting bit to generate another starting bit whose uses are yet to be described. The xor cycles specification selects the size of the following field, the xor datum specification, using the formula SIZE=xor cycles specification+17. The xor datum specification is used to modify the bit stream defined by the starting bit and skippers. The master holdback specification and initial holdback specification are used to generate the initial values for storage in holdback register one (1) 24 through holdback register N 25, as before.

Partition extractor 18 evaluates values for element descriptor one (1) 20 through element descriptor N 21 (N=64) as follows. Start register 90 (shown generically in work registers two (2) 96) is filled with the start point specification value with pointer register 91 also receiving that value. The value of COUNT is stored in skipper count register 93 with skipper table 92 filled with consecutive skipper values. Current skipper register 94 is initialized as zero and hence indexes the first skipper in skipper table 92. The value of NEXT is stored in delta register 95. The value of SIZE is stored (generically) in tap control register 108. Finally, the xor datum specification value is stored (generically) in LSR 106.

Since a permutation is not used on dispersed elements, partition extractor 18 sends element link information to holdback multiplexer 28 in the form a consecutively linked elements.

Figure 4:
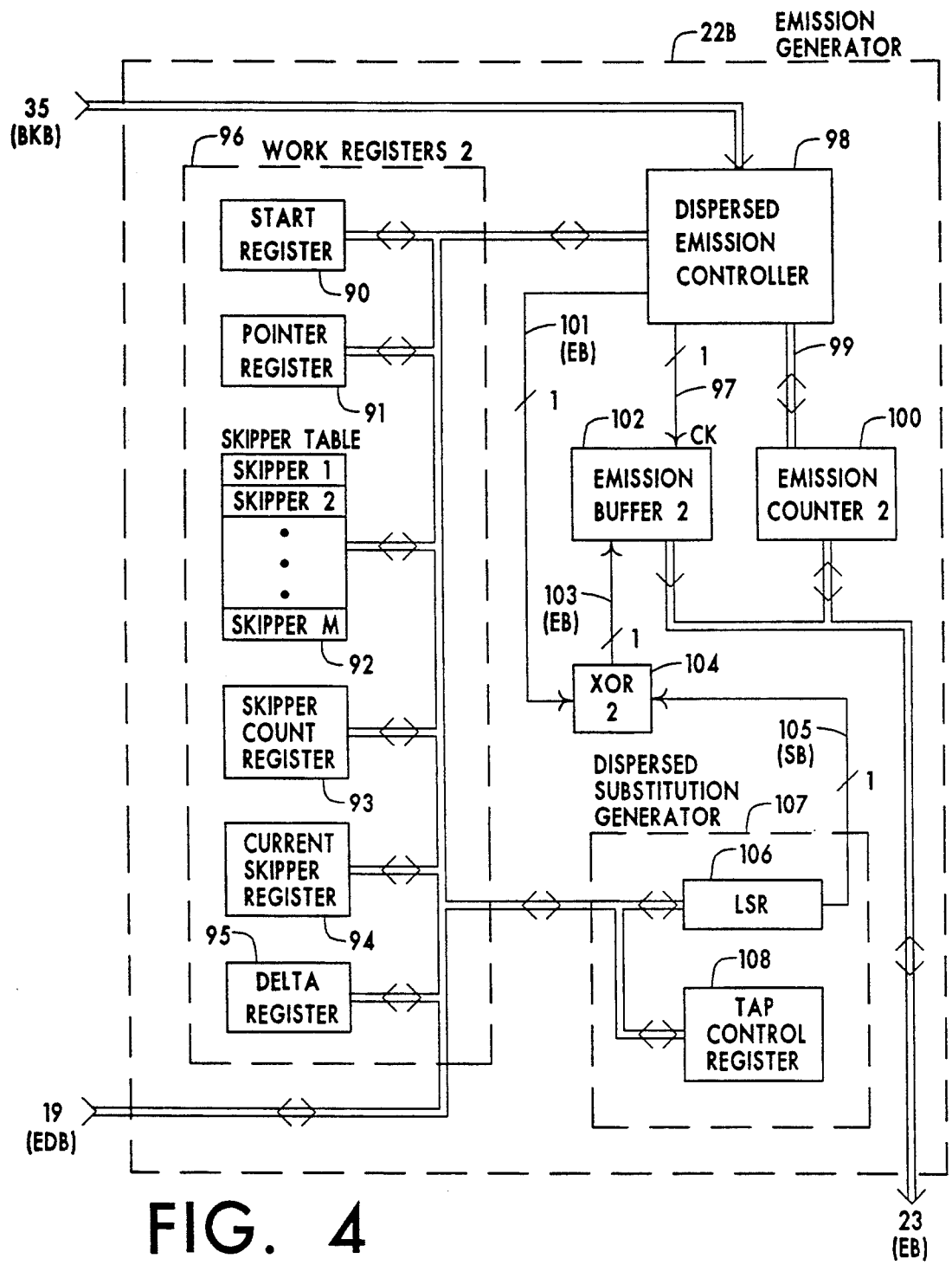
FIG. 4 is a block diagram of an emission generator used to form element emissions by a dispersed selection process which are then multiplexed in the expanding process of FIG. 1.

The operational details of (dispersed) emission generator 22b of FIG. 4 are as follows. Upon receiving an emission refill request from holdback multiplexer 28 via emission bus 23 (and through emission counter two (2) 100), dispersed emission controller 98 loads work registers two (2) 96 with the contents of the element descriptor (20-21) selected by target register 44. Dispersed substitution generator 107 is also loaded with values for LSR 106 and tap control register 108 from the selected element descriptor. Dispersed emission controller 98 checks if delta register 95 is zero and if pointer register 91 is equal to start register 90, if so, the refill request is terminated by sending to holdback multiplexer 28 an element exhausted signal.

Dispersed emission controller 98 resets emission counter two (2) 100 to zero and then begins to generate emission bits. First, dispersed emission controller 98 reads pointer register 91 to obtain the bit address in base key ram 12 for the next element bit which is sent along 101 to XOR two (2) 104. Also, the substitution bit from LSR 106 is sent along 105 to XOR two (2) 104. The output of XOR two (2) 104 is an emission bit which is sent along 103 to emission buffer two (2) 102. Emission buffer two (2) 102 is pulsed via clock 97 and the emission bit is loaded.

Dispersed emission controller 98 advances the state of dispersed substitution generator 107 by pulsing LSR 106.

Dispersed emission controller 98 advances pointer register 91 as follows. Current skipper register 94 is read with the value used to index a skipper in skipper table 92. The selected skipper is read from skipper table 92 with this value plus one added to pointer register 91. (Pointer register 91 is 19 bits wide. Hence, an advancement overflow wraps the address to the beginning of base key ram 12.)

If the new pointer register 91 value crossed (or is equal to) the starting bit as selected by start register 90, dispersed emission controller 98 detects that the sub-emission is exhausted. If delta register 95 is also zero, then the entire element emission is exhausted and pointer register 91 is filled with the contents of start register 90 to flag this condition. If the sub-emission is exhausted but delta register 95 is non-zero, the second sub-emission is begun by adding the contents of delta register 95 to start register 90 with the sum stored in pointer register 91, delta register 95 is then zeroed to flag the beginning of the second sub-emission.

Dispersed emission controller 98 advances current skipper register 94 by incrementing it once. If the new value is equal to the contents of skipper counter register 93, zero is stored in current skipper register 94 to wrap the indexing to the start of skipper table 92.

Dispersed emission controller 98 pulses emission counter two (2) 100 to accrue for the loaded emission bit. If emission buffer two (2) 102 is full (detected by checking the contents of emission counter two (2) 100 or if an emission exhausted was detected, the emission generation terminates, else, another emission bit is generated.

Upon emission generation termination, dispersed emission controller 98 pulses emission buffer two (2) 102 to right justify the content (by a number derived form emission counter two (2) 100 and the emission fragment word size). The contents of emission counter two (2) 100 and emission buffer two (2) 102 are stored in the selected emission register (26-27) as count and fragment values. The contents of the modified work registers two (2) 96 and the contents of LSR 106 (tap control register 108 is never modified) are stored in the element descriptor (20-21) selected by target register 44. Finally, dispersed emission controller 98 returns control to holdback multiplexer 28 by sending an emission refilled signal on emission bus 23.

Since each skipper is a byte value, each skipper has a mean value of 128 so that the mean length of dispersed element emissions is (64 KB/128)*2=1 KB. With 64 elements, an amorphous stream of mean length 64 KB is generated. Dispersed partition indexes have mean length of 3,188 bytes so that this version of the dispersed amorphous process would generate about 61 KB of keystream per partition.

While a permutation of the dispersed elements is superfluous because the starting point specifications are already random, the dispersed amorphous process can be extended in many non-trivially ways. (Initial xor datum position, initial skipper byte, and initial bit emitted specifications are also superfluous.) E.g., a delta element count in the partition index could be used to select the number of dispersed elements within some range. Multiple next delta specifications could be used so that more than two sub-emissions are used in generating the dispersed element emissions. Seven other sets of skippers could be generated by a series of rotations within each skippers group (with an eighth rotation restoring the skippers group to its original values), thus yielding seven times more amorphous bits. Of course, dispersed substitution generator 107 could employ a more complex design using similar means as noted above for path and substitution generator 74.

The dispersed amorphous process is less desirable than the path-based amorphous process with respects to base key bandwidth usage. In the former, each access to the base key will typically yield only one amorphous stream bit, while in the latter it would be practical to utilize (on average) about half of the base key word read (8 or more bits) during the generation process.

One problem with the expanding amorphous process method is that it could exhibit cyclic behavior, but this should be very rare. Cyclic behavior is rare because the mapping of partition indexes to partition indexes will be uniformly random provided a random base key is used, preferably a base key in which each bit is an independent random value of uniform distribution. Since partition indexes are huge (about 3 KB) and the number of partition indexes generated during an encoding session is small (about 200 for a 1 MB message), the probability that a cycle will develop is almost zero so that this case could be safely ignored. (It would take the generation of about $2^{24576}/2 = 2^{12288}$ partition indexes before a "birthday surprise" partition collision would occur with probability $\frac{1}{2}$.) Note that even the worst case of a fixed point still generates about 57 KB of keystream before repeating. And if a substitution-permutation encoder is used, 57 KB would encode at least 128 1024-bit frames (5,248 bytes) before repeating; and since this keystream will almost always not divide exactly the length needed to encode one frame (11,272 bits), the actual cycle length of frame encodings will generally be many (depending on the gcd) multiples of the approximate 128 frame blocks.

Of course cyclic prevention is easily accomplished by maintaining a list of the partition indexes used. If a partition index is generated which is already in the list, this index is simply replaced with another index which is chosen as different from all previous indexes. Alternately, cyclic behavior could be limited by maintaining only a partial list of partition indexes (the first 100 say) and/or saving only a portion of each partition index (the first 64 bits say).

Another objective of the present invention is to provide a scheme for message key explosion. Since encoding messages with 3 KB partition indexes would be burdensome, a method for expanding a much smaller message key into a larger partition index is very desirable. The preferred method will expand a 64-bit message key into a 3 KB partition index using a non-linear process which is dependent on the base key. But the method is readily adaptable to explode, say, a 80-bit message key if the later was deemed more appropriate. The exploding method to be described is very sensitive and should approach or even satisfy the "Strict Avalanche Criterion" SAC of Webster and Tavares. They write "If a function is to satisfy the strict avalanche criterion, then each of its output bits should change with a probability of one half whenever a single input bit x is complemented to x~." (Reference: A.F. Webster and S.E. Tavares, "On the Design of S-Boxes", Advances in Cryptology: CRYPTO 85 proceedings", Springer, 1986.)

Figure 5:
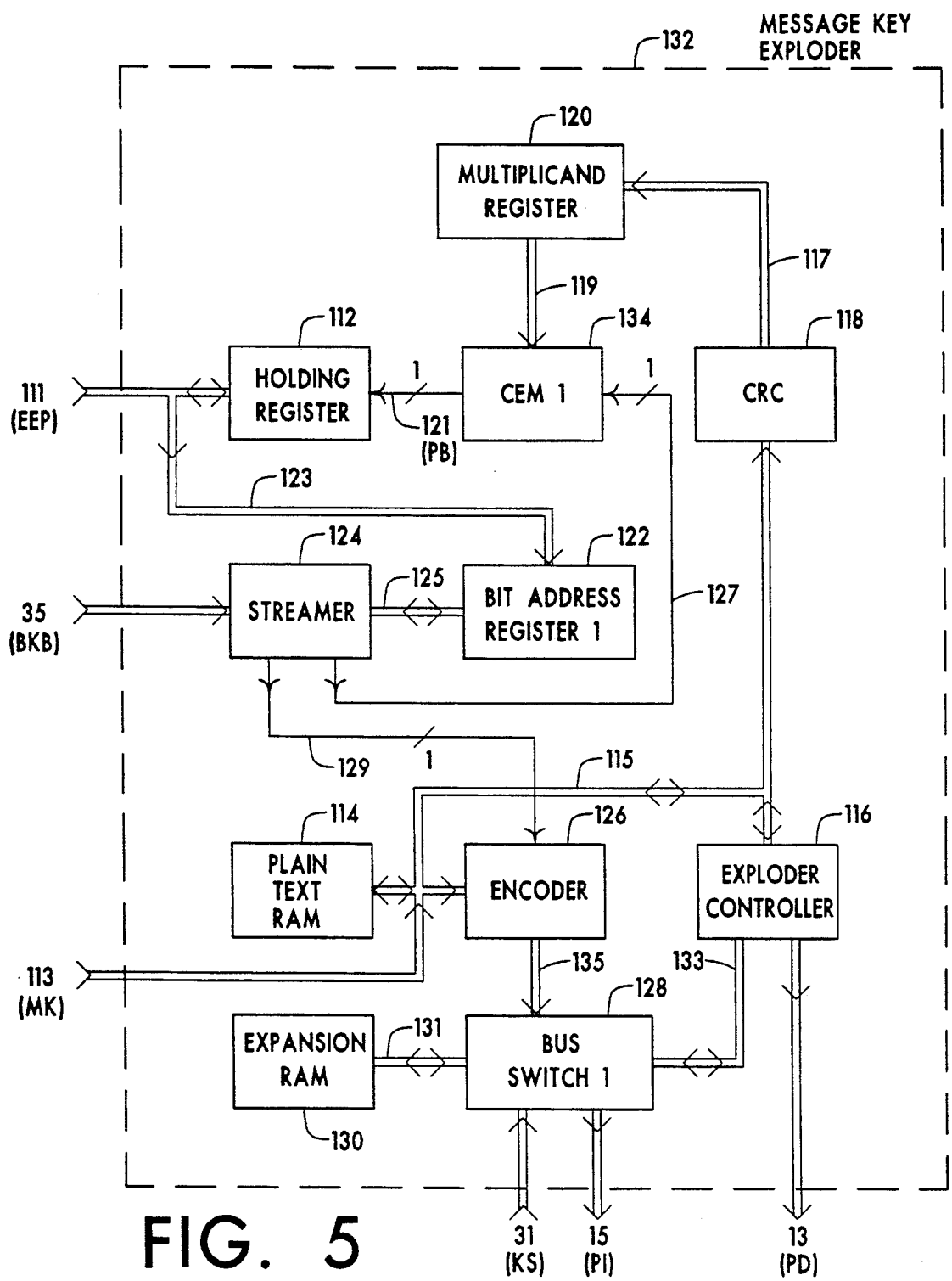
FIG. 5 is a block diagram of a message key exploder which expands a small message key into a larger partition index for use in the keystream generator of FIG. 1.

The operational details of message key exploder 132 of FIG. 5 are now described. For generality, message key exploder 132 uses an additional 19-bit parameter called an encryptive explosion pointer, although a fixed value of 0 would have sufficed. Encryptive explosion pointer 111 is stored in bit address register one (1) 122 via bus 123. Exploder controller 116 loads 64-bit message key 113 into plain text ram 114 and then makes 15 additional copies of the message key so that the leading 1024 bits in plain text ram 114 are filled.

Exploder controller 116 sends the first 64 bits of plain text ram 114 along bus 115 to CRC 118. CRC 118 performs a 16-bit cyclic redundancy code operation on the incoming plain text bits with the result stored in multiplicand register 120. Streamer 124 then forms a bit stream by successively incrementing bit address register one (1) 122 and sends the selected base key bits (fetched via base key bus 35) along 127 to CEM one (1) 134. (Bit address register one (1) is 19 bits wide so an increment overflow wraps to the start of base key ram 12 since 19 bits spans 64 KB exactly.)

CEM one (1) 134 receives a multiplier (i.e. the bitstream on 127) and a multiplicand from multiplicand register 120 along 119 and performs a coarse encoder multiplication with the product stored in holding register 112 by sending the product bits generated along 121. CEM one (1) 134 operates by forming a sequence of nineteen position value and XOR datum bit pairs from the multiplier. Each position value has 4 bits so a total of ninety-five bits from streamer 124 is required. Each position value selects some bit in 16-bit multiplicand register 120 (4 bits spans 16 bits exactly). A sequence of nineteen product bits are successively generated through successive modulo-2 addition of a XOR datum bit with a bit in the multiplicand selected by the corresponding position value.

The contents of holding register 112 is send along 123 and stored in bit address register one (1) 122. With the new bit address, streamer 124 generates a bitstream sent along 129 to encoder 126. Encoder 126 forms cipher text by encoding the first 1024 bits from plain text ram 114 using the bitstream from stream 124 as the key. The key is composed of 10,245 bits. Encoder 126 uses the first 1024 bits of the key as XOR datum which is added bitwise modulo-2 to the leading 1024 bits in plain text ram 114. Encoder 126 uses the remaining key bits as a permutation selector which specifies the permutation that encoder 126 performs on the XORed bits in plain text ram 114. Exploder controller 116 then routes the 1024 bit cipher text from encoder 126 along 135 to bus switch one (1) 128 for storage in expansion ram 130 along 131. The cipher text is defined as a first amorphous seed.

Exploder controller 116 sends the initial 561 bits of expansion ram 130 (i.e. first amorphous seed) through bus switch one (1) 128 as partition index 15 to expanding amorphous process keystream generator 32 of FIG. 1. Exploder controller 116 then receives from expansion ram 130 (through bus switch one (1) 128 along 131 & 133) the next 19 bits of the first amorphous seed (the remaining bits are discarded). Exploder controller 116 forms a partition descriptor using the 19 bits received to select a 256 byte area within base key ram 12. This descriptor is sent as partition descriptor 13 to expanding amorphous process keystream generator 32. The rough format of the first expanding (path-picking) amorphous process is to carve the selected 256 byte key area into 16 elements using 30-bit partition element specifiers.

Once initialized, expanding amorphous process keystream generator 32 passes the entire amorphous stream 33 through stream router 30 and is received by bus switch one (1) 128 as keystream 31. Exploder controller 116 routes keystream 31 for storage in expansion ram 130 as a second amorphous seed.

Similarly, though now based second amorphous seed, exploder controller 116 sends a 1,557 bit partition index 15 and a partition descriptor 13 to expanding amorphous process keystream generator 32. The rough format of the second expanding (path-picking) amorphous process is to carve a 4 KB byte key area into 32 elements using 43-bit partition element specifiers.

Again, amorphous keystream 31 received from second amorphous process is stored in expansion ram 130. The keystream received is sufficiently long by construction. The contents of expansion ram 130 thus generated is defined as the (exploded) partition index.

The key extension method (the expanding amorphous process) can be viewed from one vantage point which should be noted: the (path picking) amorphous process is an encoder which uses a very large frame size but only a small set of the possible permutations and XORings. Thus encryption could be achieved by using the plain text as a base key, and using the encryption key as the partition index, with the cipher text being the resulting amorphous stream. Obviously the partitions here must not employ holes nor truncations, and further, the carving of elements must insure that all bits are spanned. It is preferred that the XORing be separated from the path picking as was done in the dispersed amorphous process. Further, the XOR datum should be white noise so that the plain text is whitened.

This amorphous encoder has the drawback that larger and larger plain text messages would require larger and larger encryption keys, with even relatively small files requiring keys of excessive length. E.g. a 64 KB message would require an encryption key of about 5 KB, assuming that each partition element specifier includes an xor datum specification with a mean length of 40 bits. A way around non-uniform key lengths would be to employ a cryptographically secure random number generator (e.g. the contracted randoms method of the present invention) and use its keystream as the partition index for the amorphous encoding.

Another drawback is that a very small partition is undesirable while a very large partition is impractical from an efficiency standpoint, thus suggesting that small partitions should be encoded with a full permutation and XORing while larger partitions are broken up into more manageable sizes which are then individually partitioned. The amorphous encoder does make a trade-off of security for speed, but would be a good choice for software only systems where a relaxed security is acceptable.

To be more concrete, consider amorphous encoding for messages from 32 bytes to 64 KB. The following schedule table illustrates the parameters used to form a partition descriptor 13 for various message sizes.

TABLE V

| FRAME SIZE (bytes) | ELEMENT SIZE (bits) | ELEMENT COUNT | PARTITION INDEX SIZE (mean bits) | PARTITION SPECIFICATION VECTOR (bits) | | | | | | |
|---|---|---|---|---|---|---|---|---|---|---|
| 32 | 32 | 8 | 229 | 5 | 5 | 2 | 2 | 2 | 2 | 8.5 |
| 64 | 64 | 8 | 317 | 6 | 6 | 2 | 2 | 2 | 3 | 16.5 |
| 128 | 64 | 16 | 649 | 6 | 6 | 2 | 2 | 2 | 3 | 16.5 |
| 256 | 128 | 16 | 953 | 7 | 7 | 2 | 2 | 2 | 4 | 32.5 |
| 512 | 128 | 32 | 1,937 | 7 | 7 | 2 | 2 | 2 | 4 | 32.5 |
| 1024 | 256 | 32 | 3,057 | 8 | 8 | 2 | 2 | 2 | 5 | 64.5 |
| 2048 | 256 | 64 | 6,305 | 8 | 8 | 2 | 3 | 3 | 5 | 64.5 |
| 4096 | 512 | 64 | 6,497 | 9 | 9 | 3 | 3 | 3 | 5 | 64.5 |
| 8192 | 512 | 128 | 13,505 | 9 | 9 | 4 | 4 | 4 | 5 | 64.5 |
| 16,384 | 1024 | 128 | 22,081 | 10 | 10 | 4 | 4 | 4 | 6 | 128.5 |
| 32,768 | 1024 | 256 | 44,415 | 10 | 10 | 4 | 4 | 4 | 6 | 128.5 |
| 65,536 | 1024 | 512 | 89,345 | 10 | 10 | 4 | 4 | 4 | 6 | 128.5 |

TABLE V-continued

| FRAME SIZE (bytes) | ELEMENT SIZE (bits) | ELEMENT COUNT | PARTITION INDEX SIZE (mean bits) | PARTITION SPECIFICATION VECTOR (bits) |
|---|---|---|---|---|
| | | size specification | | |
| | | initial item specification | | |
| | | path picking specification | | |
| | | master hlodback specification | | |
| | | initial holdback specification | | |
| | | xor cycles specification | | |
| | | xor datum specification (mean) | | |

As an example on how the above schedule table is utilized, consider the case when exactly 150 bytes of plain text is to be encoded. This value selects the entry with 128 bytes. Thus, 16 elements should be used for the partition with a mean element size of 75 bits = 150 B/16. The xor cycles specification (a 3 bit value ranging from 0 to 7) is added to 13 so that the xor datum specification ranges from 13 to 20 bits.

Another (minor) objective of the invention is to provide for message key hiding by embedding the message key in the leading portion of the cipher text. This is mentioned in passing primarily to illustrate another use of amorphously generated bits and to exploit the large existing base key. To be concrete, consider a leading ciper text area of 4096 bits and a message key of 64 bits. Briefly, a small embedding index, say 32-bits, could be expanded by a CEM (coarse encoder multiplier) together with a base key stream using a fixed starting address. The product formed could then be interpreted as a starting address in the base key and a dispersed specifier comprised of a plurality of skipper and xor datum pairs. Through a simple dispersed amorphous process, the starting address and dispersed specifier would yield an amorphous stream.

The amorphous stream is parsed to form 64 pairs of an 1-bit operand bit and a 12-bit position index. Message bits are successively XORed with successive operand bits with these sum bits inserted into the cipher text work area at points selected by the associated position index. The resulting 4160 bits of modified cipher text, plus the embedding index, form the new leading portion of the cipher text.

Figure 6:
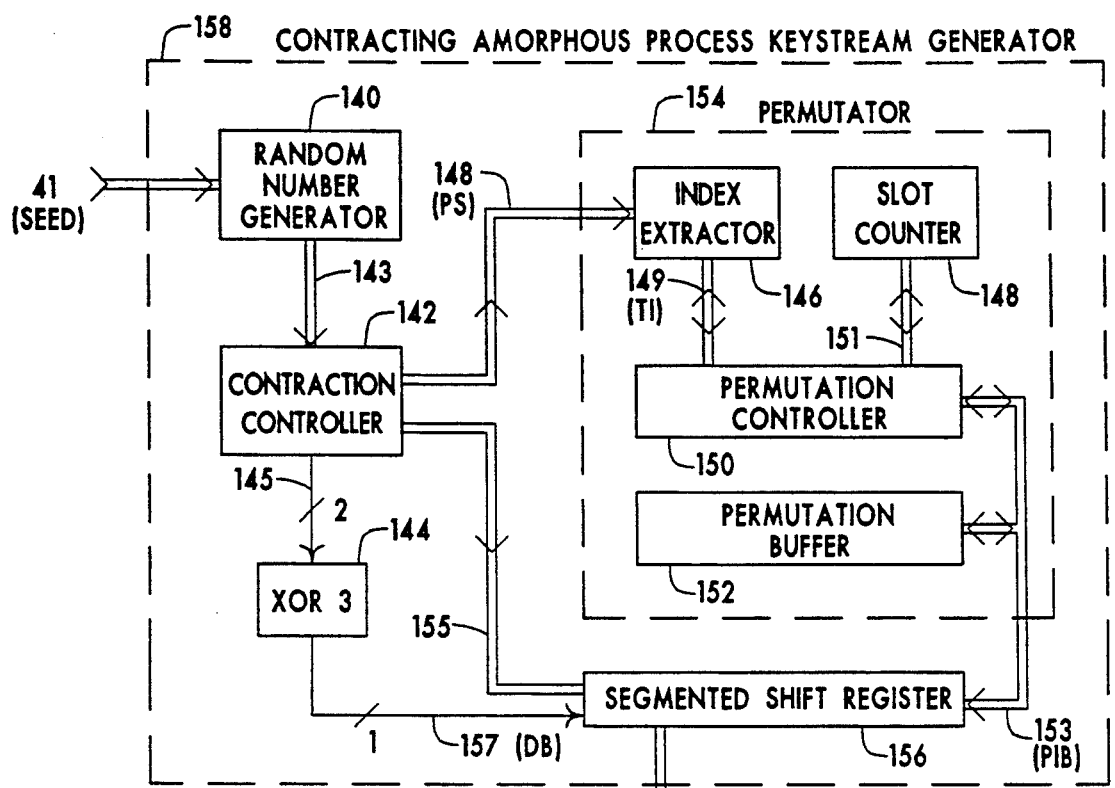
FIG. 6 is a block diagram of a keystream generator using a contracting amorphous process to contract a random number stream into a secure keystream.

The contracted randoms method of generating a keystream is now described as illustrated by contraction amorphous process keystream generator 158 of FIG. 6. For concreteness, assume that a frame size of 1024 bits is employed. Seed 141 is sent to random number generator 140 which is some pseudo-random number generation means, e.g. a maximal length LSR or a congruential multiplier. The random numbers from random number generator 140 are sent along 143 to contraction controller 142. From the incoming random numbers, contraction controller 142 first forms a permutation selector (of size 9233 bits) sent along 148 to permutator 154. Permutation selection 148 is resolved by permutator 154 into a permutation defined by a finite sequence of 1024 permuted indexes which are successively sent along 153 to segmented shift register 156.

Contraction controller 142 next forms 1024 bit pairs which are successively sent along 145 to XOR three (3) 144. The 1024 datum bits formed by XOR three (3) 144 are successively sent along 157 to segmented shift register 156. Each datum bit is stored in segmented shift register 156 at the bit location specified by a corresponding permuted index from permutator 154. After 1024 datum bits are thus stored, segmented shift register 156 is filled.

Next, contraction controller 142 forms three hundred deletors with each deletor selecting some bit in segmented shift register 156. The deletors are successively sent along 155 to segmented shift register 156 wherein each received deletor evokes the deletion of a selected bit by recovering the selected bit position through shifting the remaining bits. Each deletor is successively formed from a 10-bit value parsed from random number stream 143. Each 10-bit value is formed into a deletor by bounding the value with a modulus which is successively decremented so that each deletor selects an existing bit in segmented shift register 156.

Similarly, contraction controller 142 forms three hundred bit pairs and also three hundred creators with each creator selecting some bit position in segmented shift register 156. The bit pairs are successively sent along 145 to XOR three (3) 144 from which an additional three hundred datum bits are formed. The datum bits are successively sent along 157 for insertion into segmented shift register 156. The creators are successively sent along 155 to segmented shift register 156 wherein each received creator evokes the insertion of an associated datum bit by freeing the selected bit position through shifting the remaining bits and then storing the datum bit at the free position. Each creator is successively formed from a 10-bit value parsed from random number stream 143. Each 10-bit value is formed into a creator by bounding the value with a modulus which is successively incremented so that each creator selects an existing bit position in segmented shift register 156.

Upon completion of operations (permuted filling, deletions, then creations), the contents of the segmented shift register 156 is output along 156 as a keystream fragment. This sequence of operations is repeated using addition random numbers from random number generator 140 resulting in a plurality of keystream fragments, whose totality is defined as the keystream. (A minor performance consideration, particularly for software implementations of very large frame sizes. Instead of performing the deletions (or creations) sequentially, it would be faster to extract a sorted list of the deletors (and creators) so that only one pass of bit shifting would be required.)

The operational details of permutator 154 in FIG. 6 are described next. A permutation selector is applied to index extractor 146 along 148. Index extractor 146 signals permutation controller 150 through 149 that a selector has been received. Permutation controller 150 initializes permutation buffer 152 by successively filling the (1024 10-bit) registers therein with the consecutive integers starting with zero, i.e with the integers 0 through 1023, wherein these index values span the bit positions within segmented shift register 156 exactly. Permutation controller 150 then stores the value of 1023 along 151 into slot counter 148 so that this counter addresses the last register in permutation buffer 152.

The received permutation selector is resolved by index extractor 146 into 1023 transposition indexes which are successively sent along 149 to permutation controller 150. Permutation controller 150 converts each transposition index into a permuted index by outputting the contents of the permutation buffer 152 register selected by the transposition index through permuted index bus 153. After outputting a permuted index, permutation controller 150 reads slot counter 148 via 151 to obtain an address selecting a register in permutation buffer 152 which is read via 153, the contents of which are stored in the permutation buffer 152 register selected by the transposition index.

Upon processing a transposition index, permutation controller 150 pulses slot counter 148 which is then decremented. Permuted indexes are formed until slot counter 148 reaches zero, which is detected by permutation controller 150 which then reads the first register in permutation buffer 152 and outputs its contents as a final permuted index.

Figure 7:
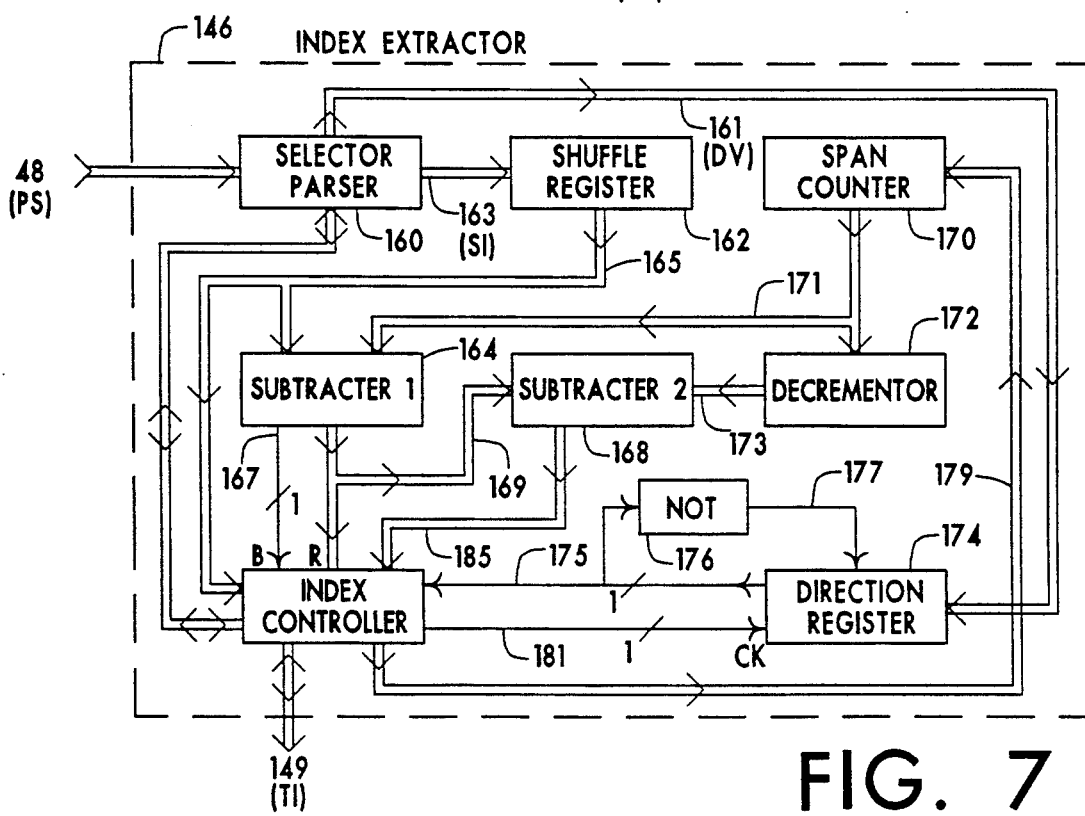
FIG. 7 is a block of the "hashed division" index extractor used to generate permutations for use in the contracting amorphous process of FIG. 6.

The operational details of (hashed division) index extractor 146, as depicted in FIG. 7, are described next. A 9233-bit permutation selector is applied to selector parser 160 along 148. The first 16-bits of received permutation selector are sent by selector parser 160 as a direction value along 161 and stored in direction register 174. Index controller 166 then stores the value of 1024 (i.e. the number of bits to permute) along 179 into span counter 170.

From the remaining 9217 permutation selector bits, selector parser 160 successively forms 1023 shuffle indexes by using the minimal number of bits needed to span the maximum value for the transposition index to be derived from that shuffle index. Specifically, 512 10-bit shuffle indexes are formed, then 256 9-bit shuffle indexes are formed, and so on. (Actually, all shuffle indexes are 10 bits long. A 9-bit index is padded with a leading zero to form a full sized shuffle index, and so on.)

Index controller 166 transforms each shuffle index into a transposition index which is output at 149 by the following process. A shuffle index from selector parser 160 is sent along 163 and stored in shuffle register 162. The contents of span counter 170 are sent along 171 and subtracted from the contents of shuffle register 162 sent along 165 by subtracter one (1) 164. Index controller 167 receives borrow 167 from subtracter one (1) 164 and outputs the contents of shuffle register 162 received along 165 as the transposition index provided that borrow 167 is active (i.e provided shuffle index<span counter).

Whenever borrow 167 is inactive, the contents of span counter 170 received along 171 by decrementor 172 are used to form a decremented value at 173. Result 169 from subtracter one (1) is subtracted from decremented value 173 by subtracter two (2) 168 to form a result sent to index controller 166 along 185. Then index controller 166 outputs as the transposition index either result 169 received from subtracter one (1) 164 or result 185 received from subtracter two (2) 168; the selection made is dependent on the output of direction register 174 received along 175, say a zero selects the former result and a one selects the later. Upon selecting one of the results, index controller 166 pulses direction register 174 via clock 181 to advance the state of that simple LSR, wherein NOT 176 complements output 175 to form a signal at 177 which is shifted into direction register 174 as the output is shifted out.

Upon outputting a transposition index, index controller 166 pulses span counter 170 via 179 in order to decrement it. This process continues until all of the shuffle indexes are transformed into transposition indexes.

Although described for a frame size of 1024 bits, index extractor 146 would work for any frame size (as would permutator 154) but is particularly efficient when the frame size is some power of 2. This index extractor requires neither division nor multiplications, and only requires a permutation selector slightly larger than the "division" variant. In fact from induction it can be readily shown that SIZE(permutation selector)$=1+(N*M)$ bits where $N=2*2^M$.

Index extractor 146 generates transposition indexes which are nearly uniformly distributed. Note that if the shuffle indexes were simply bounded, the bias introduced by modulus bounding would be a positive bias for the leading values of transposition indexes, i.e. 0, 1, 3, etc. However, the leading values which are doubly mapped grows (one element per stage) until all but one are doubly mapped, and then selector parser 160 advances to the next wave (with one less bit in the shuffle indexes) and the doubly mapped list is reset to one element again. But by reflecting the doubly mapped items to the tailing values via subtracter two (2) 168, the bias is dispersed, with the remaining bias randomly dispersed with the outputs from direction register 174. Better dispersion could be obtained by reflecting towards the middle of the interval half of the time, i.e. by spreading the bounded value out by mapping the odd values to the right and the even values to the left of the interval's center; but in many applications this improved distribution would not merit the additional complexity. Of course, even more complex reflections could be employed to obtain even smoother distributions.

Direction register 174 and NOT 176 function as a linear shift register. It is initialized with independent data for each permutation to resolve. Alternately, this LSR could be initialized once and used to form all subsequent permutations, thus minimizing the need for keystream. Then, use of a more complex linear shift register of very large period would be an attractive yet simple enhancement. Of course, the linear shift register section could reuse a portion of the partition selector or use pre-defined values and thus eliminate the need for any additional bits. (To simplify index controller 166, direction register 174 could always be advanced once for each transposition index formed regardless of whether a selection is required.)

To increase the contracting ratio of the amorphous process of FIG. 6, permutator 154 could use an index extractor 146 which employs "multiplication" instead of "hashed division". Here, each "shuffle index" would be interpreted as a real value between zero and one. Transposition indexes would be formed by scaling each shuffle index through a multiplication with the span counter contents. Since more and more bits could be used to form each shuffle index, any ratio of contraction desired is possible. To overcome the predominance of the leading bits, shuffle indexes could be formed by XORing together two or more portions parsed from the permutation selector. This technique could also be used with the "hashed division" index extractor of FIG. 7.

A similar increase in the contraction ratio could be achieved by using more than two bits when forming datum bits with XOR three (3) 144. This substitutive component can be made arbitrarily dense, thus again lending to any contraction ratio desired.

Another mechanism which increases the contraction ratio while adding more amorphousness is staggering, i.e. dynamic field sizing. Staggering could be used for both XOR datum and transposition index generation. An example for staggered field generation is as follows. The parser takes 2 bits from the incoming stream, the stagor, and forms the value COUNT=3+stagor where stagor ranges from 0 to 3. The parser then outputs the next COUNT bits as the field, which here range from 3 to 6 bits. Thus, a parsed stream of stagor and field pairs would look as follows: 01 1001 00 101 11 100101 00 110.

A very simple yet very important keystream generation configuration results from combining the key extension method and the contracted randoms method by using the keystream from the former to feed the later. Specifically, this "amorphous teeter-totter" could be implemented by replacing the random number 140 of FIG. 6 with keystream 31 from the expanding process of FIG. 1 wherein keystream 159 is used as the actual keystream. The equivocation resulting from even a small contraction ratio of say 5 (i.e. 5 bits to encode 1 bit, thus requiring 6 bits to output 1 bit) would hide keystream 31 to the extent that keystream 159 is for all practical purposes suitable for use in a one-time pad.

The amorphous teeter-totter is functionally similar to moving the transposition component of the encoder to the keystream generation point. However, a contracting amorphous process can include annihilation (deletions) and creations thus making the amorphous teeter-totter more flexible. Alternatively, an amorphous teeter-totter could be employ two expanding amorphous processes, wherein the contraction of the later results by reducing successive base key and partition index pairs from the former into amorphous streams.

The contracted randoms method is not as efficient as the key extension method, making keystream generation based on contracted randoms less attractive for encoding. However, the contracted randoms method is an attractive means for generating keys for use by the key extension method. Then only a small key kernel, say 40 bytes, needs to be stored and generated, possibly by a truly random process. This key kernel is expanded to its 64 KB form only when needed. In large computer systems, high speed circuitry with possibly multiple RN generators could be employed for rapid key kernel expansion even if a highly contractive amorphous process was used.

Alternatively, a key kernel in the form of a message key could be used to generate the base keys needed by the key extension method. Here, say a 48-bit key kernel (message key) together with a 1 MB generator base key could be used to form 64 KB work keys by message key explosion and key extension using the generator base key.

The preceding two base key generation methods could be combined in various ways. E.g., a key kernel could be expanded into a 70 KB item plus seeding information for a contracting amorphous process using pseudo random number generator(s). The output from the contracting process could then be used to form deletors, which are applied to the 70 KB item to reduce it to a 64 KB base key.

Such a scheme would be practical for a host system which must manage potentially millions of base keys. For example consider the implications of using these methods for electronic funds transfer. A 64 KB key can easily be stored on a $5 EEPROM. A card with an EEPROM plus a microprocessor and support logic could be housed as a low cost "smart card" for transaction purposes such as checking accounts, credit cards, or even governmental currency. The above methods for generating base keys eliminates the need for massive storage while the storage of large 64 KB keys at the card level is quite practical. The amorphous generation of the base keys would effectively hide the method so that even an opponent with knowledge of all the base keys in use would still not be able to generate any other possible base keys.

Figure 8:
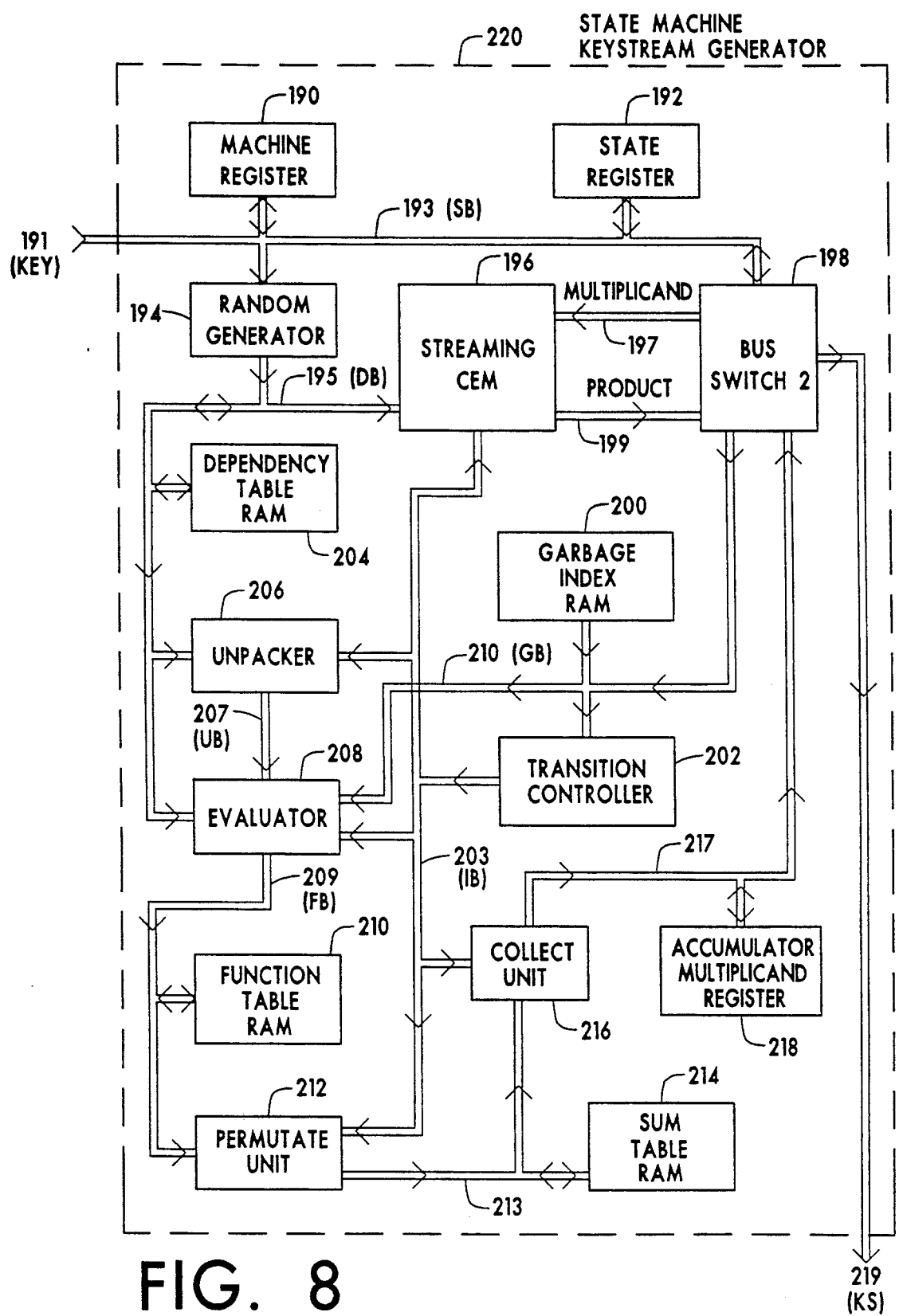
FIG. 8 is a block diagram of a keystream generator using a state machine to generate random numbers.

The state machine method of generating a keystream is now described. FIG. 8 depicts state machine keystream generator 220 and illustrates the basic operations of this method. Without loss of generality, the state machine method will be described with a particular implementation. The particular functional details were implemented in software wherein the appendix dealing with statistical testing may be consulted for results on this implementation.

A key is first applied to state machine keystream generator 220. Here the key is composed of two parts: a 64-bit machine index which is stored in machine register 190, and a 64-bit state variable which is stored in state register 192.

The general outline is to derive from machine register 190 and state register 192 through a non-linear (amorphous) process a new value for state register 192, and also an output value to be used to form the keystream. Thus transition after transition, a next state variable is produced along with an output value. This transition process is broken into seven steps as described below.

The first step of each transition is to fill (the 1024 byte) dependency table ram 204 using the output from random generator 194 which is seeded from both machine register 190 and state register 192.

Figure 9:
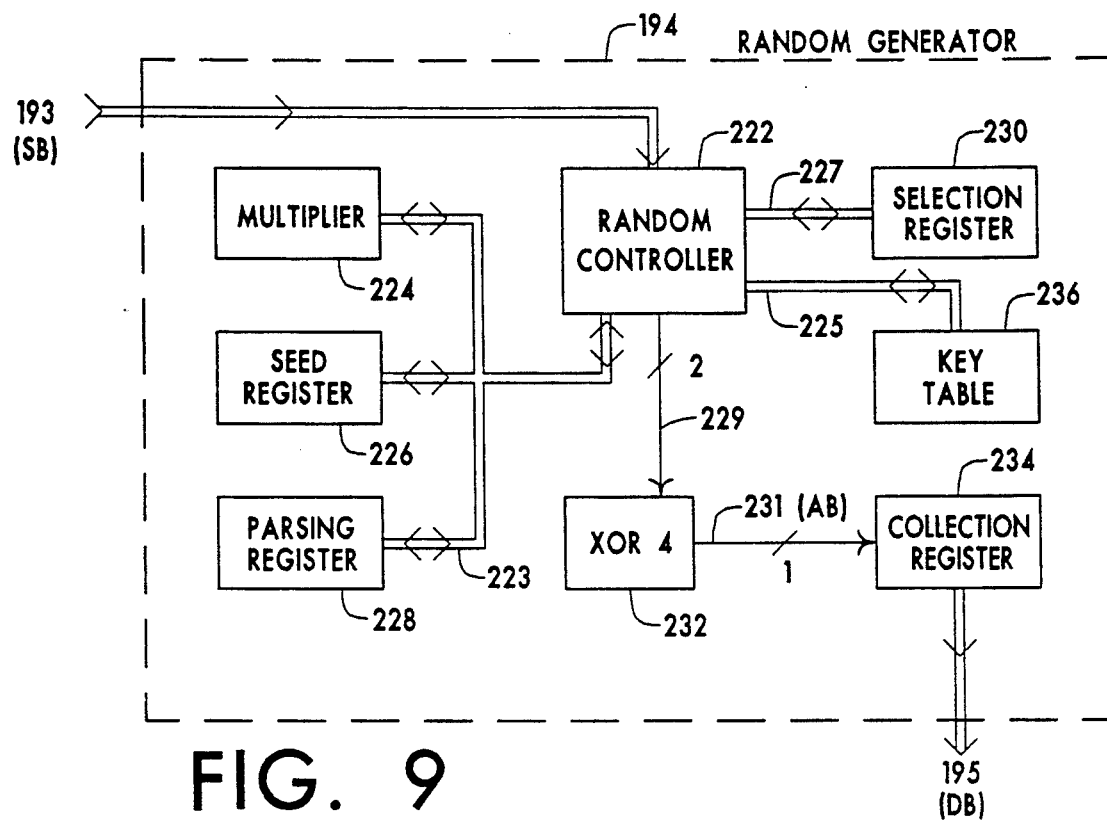
FIG. 9 is a block diagram of the random generator used to form dependency bits via a contracting amorphous process for use in the state machine of FIG. 8.

FIG. 9 depicts random generator 194 which operates in the following manner. Random controller 222 receives along state bus 193 the first 32 bits of machine register 190 and the first 32 bits of state register 192, which are XORed together (with the least significant bit then set to one) to form a first seed value which is sent along 223 and stored in 32-bit seed register 226.

Random controller 222 advances seed register 226 by first sending its contents along 223 to multiplier 224. Multiplier 224 forms a product by multiplier together received seed value and a fixed value of 663608941 with the upper 32 bits of the product discarded. (This multiplication forms a congruential multiplier, denoted as U13 in The Handbook of Random Number Generation and Testing.) Multiplier 224 sends the lower 32 bits of the product along 223 and is stored back in seed register 226.

As a momentary aside in the explanation of the preferred embodiment of the present invention, the use of a congruential multiplier may seem strange. Namely, a whole goal of the present invention is to escape from a composite random number generator design entirely. The reason that a congruential multiplier is used is to reduce the possibility of fixed points. If a dispersed expanding process were to be applied directly to the machine index and state variable as input, these input values would have to be random to produce a random output for the dependency table. It happens that, if both the machine index and state variable were zero, the dependency table, the next state variable, and the output value would all also be zero! Thus, a source of random numbers is needed which can supply random numbers that are then amorphously contracted to form a dependency table. Statistical tests, included in Appendix 3, have been run on the state machine in accordance with the present invention. The suitability of a congruential multiplier for its random number generation function has been verified.

Continuing in FIG. 9, random controller 222 fills 32 byte key table 236 by storing the upper 16 bits of seed register 226 along 225 into the first two bytes of key table 236. By the method just described above, multiplier 224 is repetitively used to advance seed register 226, with each advancement yielding another two bytes for storage in successive location in key table 236. A total of 16 cycles are needed to fill key table 236.

Next, random controller 222 receives along state bus 193 the second 32 bits of machine register 190 and the second 32 bits of state register 192, which are XORed together (with the least significant bit then set to one) to form a second seed value which is stored in seed register 226. Random controller 222 then sends the value zero along 227 for storage in selection register 230 which, thus initialized, selects the first bit in key table 236.

Random controller 222 then forms a sequence of 8192 amorphous bits which are concatenated (say 32 bits at a time) by collection register 234 with these (concatenated) random outputs successively sent along 195 for storage in 1024 byte dependency table ram 204. The formation of amorphous bits (using a dispersed amorphous process) is as follows.

Random controller 222 advances seed register 226 as described above via multiplier 224. The contents of seed register 226 are then sent along 223 and stored in 32-bit parsing register 228. Parsing register 228 is pulsed by random controller 222 resulting in the four least significant bits being discarded. The remaining 28 bits are successively parsed into seven pairs with each pair containing a 3-bit skipper and a 1-bit XOR datum bit. Each of the seven pairs is used to form one amorphous bit. After forming seven amorphous bits, the process repeats by first advancing seed register 226, and then so on.

To transform a said pair into an amorphous bit, random controller 222 request the next three bits (the skipper) from parsing register 228 with this value (ranging from 0 to 7) added to the contents of selection register 230. (Selection register 230 is 8 bits wide so an overflow will wrap to the staring address in key table 236.) The new contents of selection register 230 are used to address a bit in key table 236 which is received by random controller 222 along 225 and sent to XOR four (4) 232 along 229. Random controller 222 then receives from parsing register 228 the next bit therein with this value (the XOR datum bit) also sent along 229 to XOR four (4) 232. The output of XOR four (4) 232 is an amorphous bit which is sent along 231 for storage in collection register 234. Random controller 222 then increments the contents of selection register 230, and continues until enough bits are generated.

After filling dependency table ram 204, the second step is to fill 1024-bit garbage index ram 200 using streaming CEM 196. Streaming CEM 196 (a coarse encoder multiplier) operates by forming product 199 from multiplicand 197 using a multiplier stream derived from dependency table ram 204 based on a starting address received on index bus 203. (Streaming CEM 196 operates identically to CEM one (1) 134, streamer 124, and bit address register one (1) 122 of FIG. 5.) Transition controller 202 sends along 203 a starting address of zero to streaming CEM 196. The contents of machine register 190 and state register 192 (effectively concatenated together) are sent along 193 and routed through bus switch two (2) 198 along 197 to provide streaming CEM 196 with a 128-bit multiplicand. The product (here formed using 7-bit position values and 1 bit XOR datum values parsed from the multiplier stream of dependency bits) is sent along 199 to bus switch two (2) 198 and routed along garbage bus 201 for storage in garbage index ram 200.

Garbage index ram 200 is decomposed by transition controller into fields which are used by the subsequent steps. The following table shows this decomposition:

TABLE VI

| FIELD NAME | SIZE |
|---|---|
| global dependency index | 13 bits |
| packed function indexes | 784 bits: 16 49-bit items |
| (byte alignment: not used) | 3 bits |
| nibble perm selector | 128 bits |
| accumulation index | 8 bits |
| permutation selector | 49 bits |
| state emitter index | 13 bits |
| output emitter index | 13 bits |
| (excess: not used) | 13 bits |

The third step is to fill 32 byte function table ram 210. This is accomplished by 16 stages of successively expanding a 49-bit packed function index by means of unpacker 206 to form a 57-bit function index which is sent to evaluator 208 which produces a 16-bit value for storage in function table ram 210. After all 16 packed function indexes are thus processed, function table ram 210 FIG. 10 depicts unpacker 206 which operates in the following is filled.

Figure 10:
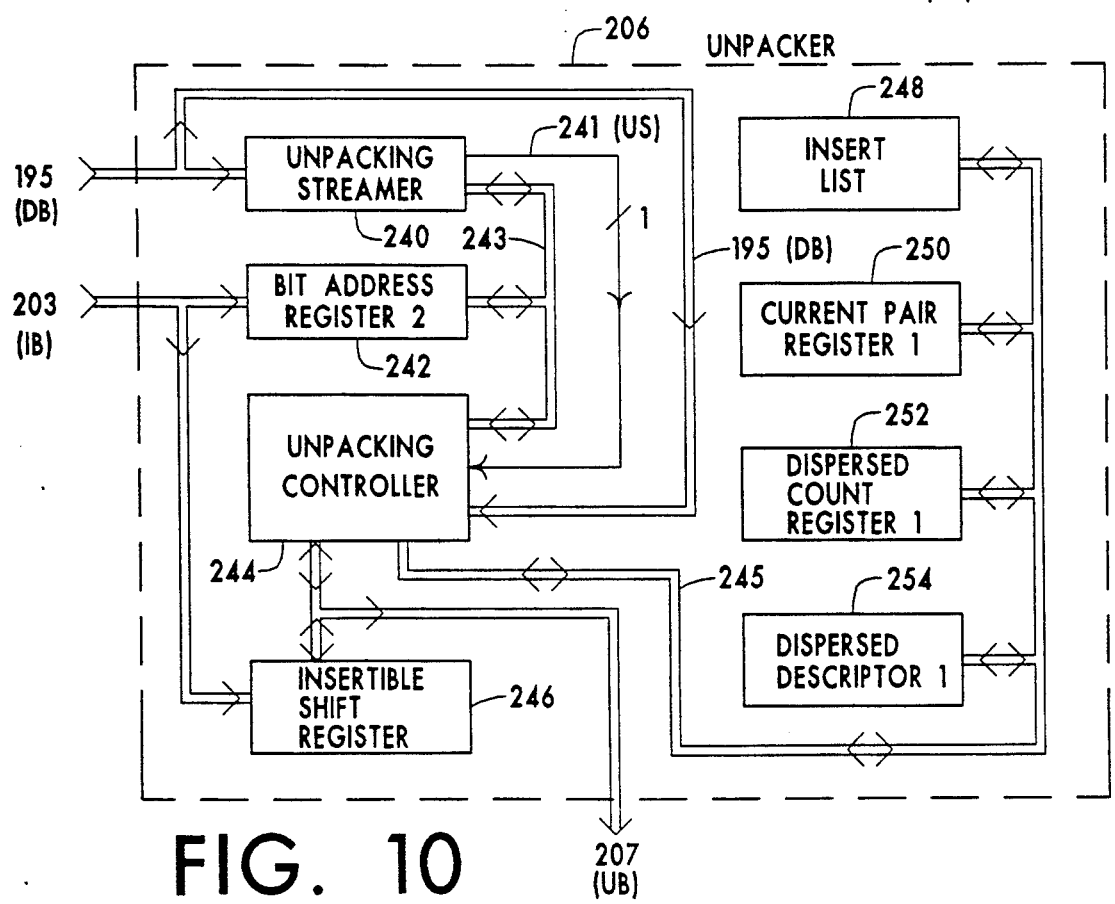
FIG. 10 is a block diagram of the unpacker used to form function indexes from packed function indexes for use in the state machine of FIG. 8.

FIG. 10 depicts unpacket 206 which operates in the following manner in order to insert eight bits generated by a dispersed amorphous process into a packed function index to expand it. Transition controller sends the 13-bit global dependency index decomposed from garbage index ram 200) along 203 and is stored in bit address register two (2) 242 within unpacker 206. Unpacking streamer 240 forms an unpacking stream at 241 by outputting successive bits of dependency table ram 204 (received along dependency bus 195) selected by bit address register two (2) 242. (Note that 13-bits address each bit in 1024 bytes exactly.) The unpacking stream is sent along 241 to unpacking controller 244, and is used continuously to expand all 16 of the packed function indexes.

At each unpacking stage, transition controller 202 sends the next 49-bit packed function index along 203 with this index stored in insertible shift register 246. Unpacking controller 244 takes the first three bits of insertible shift register 246, and increments this quantity, to form a value (ranging from 1 to 8) which is sent along 245 and stored in dispersed counter register one (1) 252. Unpacking controller 244 takes the 2nd through 49th bits of insertible shift register 245 and sends this 48-bit value along 245 for storage in insert list 248. Then, unpacking controller 244 initializes current pair register one (1) 250 with a value of zero to select the first pair in dispersed descriptor one (1) 254.

Unpacking controller 244 receives unpacking stream 241 and from consecutive unpacking bits forms pair(s) of a 1-bit XOR datum and a 3-bit skipper. Each pair is successively sent along 245 for storage in dispersed descriptor one (1) 254 with dispersed count register one (1) 252 specifying the number of such pairs to form. E.g. if three pairs are specified and the unpacking stream is 011010100100, dispersed descriptor one (1) 254 is filled as follows:

TABLE VII

| XOR DATUM | SKIPPER |
|-----------|---------|
| 0 | 110 (6) |
| 1 | 010 (2) |
| 0 | 100 (4) |

Unpacking controller 244 successively forms eight creature bits by the following dispersed amorphous process. The bit from dependency table ram 204 selected by bit address register two (2) 242 is received along 195. Unpacking controller also receives the XOR datum bit in dispersed descriptor one (1) 254 as selected by current pair register one (1) 250. The dependency bit and XOR datum bit are XORed together with the result defined as a creature bit. Bit address register two (2) 242 is advanced by adding to it the value of the associated skipper (from dispersed descriptor one (1) 254) plus one. Current pair register one (1) 250 is advanced by incrementing it; though if the new value is equal to the contents of dispersed count register one (1) 252, current pair register one (1) 250 is reset to zero instead.

Unpacking controller 244 successively inserts each creature bit into insertible shift register 246 at successive positions derived from insert list 248. The 48 bits in insert list 248 are internally stored in eight 6-bit position items. Each position item is successively bounded by a modulus of 49, 50, . . . , 56 in order to derive a valid insert position. Once all creature bits are inserted, insertible shift register 246 contains a function index which is sent along unpacked bus 207 to evaluator 208.

Each 57-bit function index from unpacker 206 is decomposed by evaluator 208 into the seven fields as shown in the table below, and these are used by evaluator 208 to generate a 16-bit function value to be stored in function table ram 210.

TABLE VIII

| FIELD NAME | SIZE |
|------------|------|
| order index | 1 bit |
| dependency index | 13 bits |
| operand1 index | 13 bits |
| operand2 index | 13 bits |
| operand3 index | 13 bits |
| operation1 index | 2 bits |
| operation2 index | 2 bits |

Evaluator 208 computes FUNCTION VALUE = Operation B( Operation A( Op1, Op2), Op3) to obtain the 16-bit function value. The order index selects which operation class is evaluated first, with (A=1, B=2) if order index is 0, and (A=2, B=1) otherwise. The operands and operations to be used are described directly below.

Figure 11:
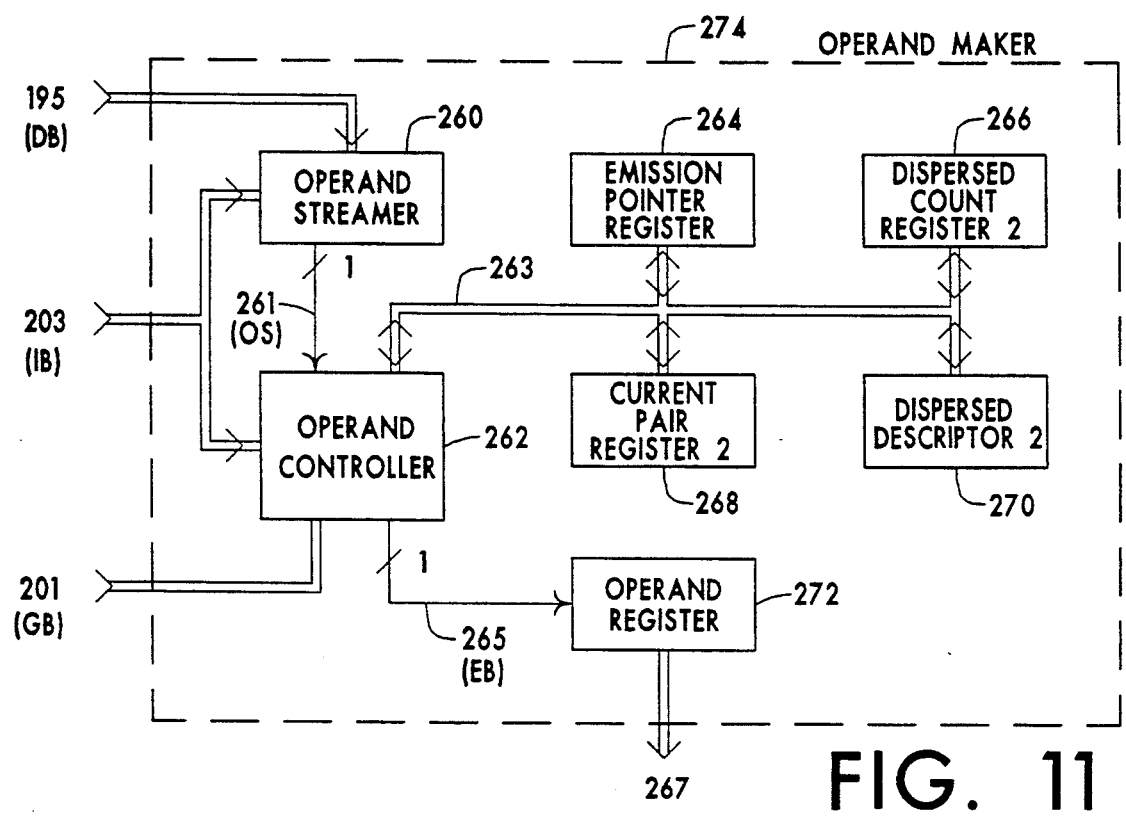
FIG. 11 is a block diagram of the operand maker used to form operands for use in the state machine of FIG. 8.

Operands Op1, Op2, Op3 are successively generated from respectively operand1 index, operand2 index, and operand3 index by operand maker 274, depicted in FIG. 11, in the following manner. First, evaluator 208 sends the 13-bit dependency index (parsed from a function index) along index bus 203 and is stored in operand streamer 260. Operand streamer 260 (functions same as unpacking streamer 240 of FIG. 10 and also is based on dependency table ram 204) outputs an operand stream along 261 to operand controller 262.

At each of the three stages, evaluator 208 sends an operand index along 203 to operand controller 262. Operand controller 262 decomposes the received operand index into two fields: a 3-bit extraction index and a 10-bit source index. The extraction index is incremented (now ranging from 1 to 8) and sent along 263 for storage in dispersed count register two (2) 260. The source index is stored in emission pointer register 264 with this value selecting a bit in garbage index ram 200 (10 bits spans 1024 bits exactly). Then, operand controller 262 initializes current pair register two (2) 268 with a value of zero to select the first pair in dispersed descriptor two (2) 270.

From consecutive bits of received operand stream 261, operand controller 262 forms pair(s) of a 1-bit XOR datum and a 3-bit skipper. Each pair is successively sent along 263 for storage in dispersed descriptor two (2) 270 with dispersed count register two (2) 266 specifying the number of such pairs to form.

In a manner identical to creature bit formation by unpacker 206, operand controller 262 forms emission bits by the following dispersed amorphous process. The bit from garbage index ram 200 selected by emission pointer register 264 is received along 201. Operand controller also receives the XOR datum bit in dispersed descriptor two (2) 270 as selected by current pair register two (2) 268. The garbage index bit and XOR datum bit are XORed together with the result defined as an emission bit. Emission pointer register 264 is advanced by adding to it the value of the associated skipper (from dispersed descriptor two (2) 270) plus one. Current pair register two (2) 268 is advanced by incrementing it; though if the new value is equal to the contents of dispersed count register two (2) 266, current pair register two (2) 268 is reset to zero instead.

Operand controller 262 sends each emission bit along 265 for storage in operand register 272. When enough emission bits are generated, either 8 or 16 bits depending on the selected operation, the contents of operand register 272 are output at 267 with this value defined as an operand.

Evaluator 208 uses the 2-bit field, operation1 index parsed from a function index, to select a logical computation to be used for Operation1 from the following table, here shown with Op1 and Op2 used generically. Here, operands are 16 bits long. (Op1_low denotes the lower 8-bits of Op1, and similarly for "high". "+" is used to denote concatenation.)

TABLE IX

| INDEX | COMPUTATION (LOGICAL) |
|-------|----------------------|
| 0 | (Op1_low AND Op2_low) + (Op1_high OR Op2_high) |
| 1 | (Op1_low OR Op2_low) + (Op1_high AND Op2_high) |
| 2 | Op1 XOR Op2 |
| 3 | (NOT Op1) XOR Op2 |

Similarly, operation2 index selects an arithmetic computation to be used for Operation2 from the following table. Here, operands are 16 bits long except for Op2 in DIV where an 8-bit operand is required.

TABLE X

| INDEX | COMPUTATION (ARITHMETIC) |
|---|---|
| 0 | Op1 ADD Op2 (carries are ignored) |
| 1 | Op1 SUB Op2 (borrows are ignored) |
| 2 | Op1 MUL Op2, ADD low and high parts |
| 3 | Op1 DIV Op2, XOR dividend & divisor to quotient |

MUL (index=2) multiples two 16-bit values which results in a 32-bit value. This 32-bit value is decomposed into low and high 16-bit values which are then added. This 16-bit sum, ignoring carries, is the final result.

DIV (index=3) is performed by padding Op1 with 16 leading zeros and using a 8-bit Op2 which is padding with 8 leading zeros. The division is performed on 32-bit dividend with a 16-bit divisor (forced to 1 if originally 0) and, thus bounded, results in a 16-bit quotient and 16-bit remainder. The 16-bit quotient is XORed with 16-bit Op1, and then the high 8-bit quotient portion is XORed with 8-bit Op2. This modified 16-bit quotient is the final result. These XORings of the quotient were chosen to whiten the division process which generates too few 1's.

Thus, the third step of filling function table 210 has been fully described.

The fourth step is to fill 32 byte sum table ram 214. To this end, transition controller 202 sends the 49-bit permutation selector and the 128-bit nibble perm selector (parsed from garbage index ram 200) along index bus 203 to permutate unit 212. Permutate unit 212 first applies the 49-bit permutation selector to a "hashed division" permutator to obtain a new ordering of the 16 elements in function table ram 210. E.g., (F5 F12 F3 F15 F7 F1 F8 F14 F6 F2 F10 F9 F16 F4 F11 F13). Consecutive pairs from this function element reordering are transformed by nibble permutations to form 8 32-bit sum elements labeled S1 to S8. Permutate unit 212 successively forms and sends each sum element along 213 for storage in sum table ram 214, thus filling it.

Permutate unit 212 decomposes the 128-bit nibble perm selector into 8 16-bit nib selectors which are successively sent to a "division" permutator with the resulting permutations applied to successive (permuted) function pairs. For example, take the first pair of F5 and F12. These 16-bit function elements are decomposed into 4 nibbles each, here represented by F5=f5a+f5b+f5c+f5d and F12=f12a+f12b+f12c+f12d where "+" denotes concatenation. Applying the first nib selector to (f5a f5b f5c f5d f12a f12b f12c f12d) will permute these nibbles into say (f12c f5d f5a f12b f12a f5b f5c f12d). The first sum element then becomes S1 f12c+f5d+f5a+f12b+f12a+f5b+f5c+f12d.

The fifth step is to fill 16 byte accumulator multiplicand 218. To this end, transition controller 202 sends the 8-bit accumulation index (parsed from garbage index ram 200) along 203 to collect unit 216. Collect unit 216 receives successive pairs from sum table ram 214, combines each pair to form a 32-bit accumulation element, with these 4 accumulation elements A1, A2, A3, A4 sent along 217 for storage successively in accumulator multiplicand register 218, thus filling it.

Collect unit 216 operates by decomposing received accumulation index into 4 2-bit collector indexes. The following table defines the sum element pair combining function for a given collector index value. (In the table below, the pair S1 and S2 is used generically. E.g. if the 2nd collector index has a value of 2, then apply the formula A2=S3 XOR S4.)

TABLE XI

| INDEX | COMPUTATION |
|---|---|
| 0 | S1 ADD S2 (carries are ignored) |
| 1 | S1 SUB S2 (borrows are ignored) |
| 2 | S1 XOR S2 |
| 3 | (NEG S1) XOR S2 |

The sixth step is to form a 512-bit product which is defined as the next component of the keystream. To this end, transition controller sends the 13-bit output emitter index (parsed from garbage index ram 200) along 203 to streaming CEM 196 to define the starting bit of the multiplier stream. Transition controller 202 then configures bus switch two (2) 198 to route the 128-bit contents of accumulator multiplicand register 218 along 217 to provide for a multiplicand at 197. Streaming CEM decomposes the multiplier stream into 512 pairs of 7-bit position values and 1-bit XOR datum values, and are applied to the multiplicand to form a 512-bit product. Product 199 is sent through bus switch two (2) 198 and output at 219 as a keystream fragment.

Finally, the seventh step is to form a 64-bit product which is used as the next state variable. To this end, transition controller sends the 13-bit state emitter index (parsed from garbage index ram 200) along 203 to streaming CEM 196 to define the starting bit of the multiplier stream. Transition controller 202 then configures bus switch two (2) 198 to route the 128-bit contents of accumulator multiplicand register 218 along 217 to provide for a multiplicand at 197. Streaming CEM decomposes the multiplier stream into 64 pairs of 7-bit position values and 1-bit XOR datum values, and are applied to the multiplicand to form a 64-bit product. Product 199 is sent through bus switch two (2) 198 and sent along 193 for storage in state register 192.

The particular configuration of the above state machine should be construed only as representative of this basic idea: (1) forming a dependency table from the machine index and state variable, (2) forming a garbage index from a machine index and state variable and dependency table, (3) decomposing the garbage index into fields which describe transition and output functions, and (4) evaluating these functions. Use of a separate dependency table is not essential to the state machine method of the present invention. But invariably some "dependency bits" will be required by the amorphous processes which characterize this method, whether these dependency values explicitly are from a special buffer(s) or they are from some intermediate values, or the machine index and state variable are used for dependency values.

The above state machine configuration was chosen so that its software implementations would be somewhat efficient at generating a keystream. However in hardware, the dispersed amorphous process is simple and fast enough so that its use streaming CEM 196 is practical, and even practical for filling the dependency table. And as VLSI chips become cheaper and more dense, it becomes more practical to implement the more efficient path picking amorphous process for stream generation. Further, with fast stream generation, annihilation becomes a practical option to be applied after say unpacking packed function indexes and operand generation where now these operations would produce oversized items which require some reduction.

To further clarify the types of modifications which do not go beyond the present invention, a short and terse list of state machine enhancements is enumerated: (1) employ more and/or a variable number of functions, (2) employ more and/or a variable number of operations per function, (3) employ more dependency type expansions (e.g. expand each function index field individually, thus using more dependency indexes), (4) employ more types of operations (e.g. use a generalized addition unit which uses a fairly large operation index to provide many different operations resulting from the wiring of the carries in a chain defined by resolving the operation index into several transposition indexes, i.e. a partial permutation), (5) employ more ways of combining operations and functions (e.g. use some function field to select say O5( O4(O2(o3, o2), O3(O1(o1, o4) ) from among the possible combining configurations), (6) employ more rounds before the "accumulator" stage is reached", and (7) employ residual dependency buffers which are modified by successive transitions but still depend on the value left from the previous transition.

The state machine method has two drawbacks. These result from the fact that the analysis required to guarantee large cycle lengths and good statistics may be very difficult, if not impossible. However, by judiciously chosen individual stages, and use of a CEM at the output stage, good statistics can be achieved, as empirically demonstrated, answering the second drawback.

The first drawback can be answered by using a RNG with a known cycle length to guarantee the cycle length of the state machine in the following manner. The RNG is used to provide a sequence of machine index and state variable pairs. Each pair is sent to the state machine which then generates a keystream which is limited to a small number of transitions, say a thousand. This limits cycling to within a thousand keystream fragments, a reasonable limit considering that the probability of such a small cycle is extremely small. In this configuration, the key would be the seed applied to the RNG. The security of the RNG is moot here, as long as a large cycle and good statistics can be demonstrated, because here, the state machine is intended as the means of providing cryptographic security.

Additional materials in support of a complete disclosure of the present invention are contained in five attached appendices 1 through 5.

Appendix 1 is a help for associating the language of the claims, and the functionality of the machine of the present invention as expressed in the claims, with the drawings. The association between 1) the composite names and cursory descriptions of the elements of the preferred embodiments of the machine of the inventions, as such elements are shown in the drawings and discussed in the specification, is set forth in Appendix 1 relative to 2) the language of the claims accompanying the application as originally filed. Because the claims are a part of the teaching of any application, the structure and function of the machine in accordance with the present invention may again be reviewed and understood by reference to the claims. Appendix 1 also provides a help for associating the language of the claims with the parallel teaching of the drawings and of the specification.

Appendix 2 details the data flow for selected components, and shows in particular the complete data flows of drawings FIGS. 1 and 2. The data flows set forth in Appendix 2 are organized in time sequence, and Appendix 2 thus serves as a main timing diagram (or timing chain) for the sequential, step-wise, operation of the machine in accordance with the present invention.

Appendix 3 gives statistical results for the machine generation of cryptographic keys by non-linear processes in accordance with the present invention. The generated keys are, in general, shown not to assume any significance order by virtue of the amorphous key generation process of the present invention.

Appendix 4 contains a rudimentary cryptanalysis of the amorphous process for the machine generation of cryptographic keys, and the keys so generated, in accordance with the present invention. It is in general shown that the key generation process of the present invention is relatively highly secure against cryptoanalysis.

Appendix 5 shows an example of chained multiplexing as is used in the generation of an amorphous stream during the machine generation of a cryptographic keys in accordance with the present invention.

Many of the techniques described herein above are immediately applicable to antecedent or posterior parts of the invention. Some of these employments were explicitly stated, but for brevity and for a smoother flow of idea evolution, expression of these relations was keep to a minimum. It will be understood by those skilled in the art where those further applications could have been made. Furthermore, other various changes in form and detail may be made to the preferred embodiments as disclosed without departing from the spirit and scope of the invention as defined by the appended claims.

In accordance with the preceding discussion, certain adaptations and improvements will suggest themselves to practitioners of the electronic design arts. For example, implementation of the dispersed expanding amorphous process of the present invention has been taught in hardware, but the process could conceivably be implemented (at reduced speed) in software. Statistics concerning keys produced by a software approach have not yet been developed.

The machine of the present invention is subject to modification. One potential change to the machine, as is shown in FIG. 1, would be to have a signal line from partition extractor 18 to stream router 30. As it is now, the stream router assumes a fixed size for partition indexes. This is true for the path-picking method (of FIG. 3) as described in the claims. But in this section, the enhancement of using a dynamic number of elements in partitions was suggested, and in fact was implemented together with variable sized partition indexes in the software version whose results are presented in APPENDIX 3. The dispersed method (of FIG. 4) always uses variable sized partition indexes. It is somewhat arbitrary assumed that the maximum size is always parsed from the amorphous stream. Size detection logic on extractor 18 could be implemented. Note that at present the message key exploder of FIG. 5 assumes this signaling capability in that all of the amorphous stream is routed as keystream when using the generator of FIG. 1. An implicit flag in partition descriptor is thus being used. Such a potential refinement to the machine, and process, of the present invention is in the nature of a minor detail.

In accordance with these and other possible variations and adaptations of the present invention, the scope of the invention should be determined in accordance with the following claims, only, and not solely in accordance with that embodiment within which the invention has been taught.

What is claimed is:

1. A machine for generating a cryptographic key by processes similar to those normally associated with encryption of plain text data, the machine comprising:
1) a base key source for providing a set of essentially random bits defined as a base cryptographic key;
2) a partition index source for providing an essentially random number called an amorphous partition index; and
3) an amorphous processor, receiving the base key from the base key source means and the amorphous partition index from the random number source,
for performing on the base key
a generalized combination with substitutions
in accordance with use of the amorphous partition index as a directive
in order to produce another essentially random set of bits called an amorphous bitstream, the amorphous processor including
3.1) a selector for selecting from the base key in accordance with the amorphous partition index a selected set of bits,
3.2) a sequencer for sequentially ordering the selected set of bits in accordance with the amorphous partition index to produce an ordered selected set of bits, and
3.3) a logical complimenter for logically complementing the ordered selected set of bits in accordance with the amorphous partition index to produce a logically-complemented ordered selected set of bits called an amorphous bitstream;
wherein a generalized combination with substitutions is performed on the base cryptographic key in accordance with the amorphous partition index; and
wherein the generalized combination with substitutions performed on the base cryptographic key, which base key is itself an essentially random set of bits, in accordance with the amorphous partition index, which partition index is itself an essentially random number, by the amorphous processor constitutes a process describable as amorphous, which is why the amorphous processor is called such, and is likewise why the set of bits produced by the amorphous processor is called an amorphous bitstream;
wherein the amorphous process by which the base cryptographic key is used to produce the amorphous bitstream is, because it is a generalized combination with substitutions, itself in the nature of a cryptographic transform;
as a cryptographic key likewise as is the base cryptographic key from which it is derived;
wherein no order has been imparted to the cryptographic keystream by the amorphous transformation thereof.

2. The machine according to claim 1
wherein the selector of the amorphous processor permissibly selects from the base key, in accordance with the amorphous partition index, a subset of bits that includes multiple instances of bits of the base key set;
wherein the selected set permissively contains more bits than are within the base key.

3. The machine according to claim 1 further comprising:
encryption means for using the amorphous bitstream produced by the amorphous processor as a cryptographic key in a cryptographic transform.

4. The machine according to claim 1 for generating an extended-length cryptographic key, the machine further comprising:
4) a feedback means, receiving the amorphous bitstream from the amorphous processor, for mapping the received amorphous bitstream into (i) a new amorphous partition index and (ii) a keystream portion, and for feeding back the new amorphous partition index to the amorphous processor for use therein and thereby; and
5) a recursive control means for repetitively cyclically exercising the amorphous processor and the feedback means so that, over a plurality of cycles, a plurality of amorphous bitstreams are produced by the amorphous processor and a plurality of keystream portions are produced by the feedback means;
wherein the amorphous processor recursively performs on the base key successive generalized combinations with substitutions in accordance with successive amorphous partition indices in order to produce a plurality of successive amorphous keystream portions;
wherein the plurality of successive amorphous keystream portions constitute, in aggregate, the extended-length cryptographic key;
wherein a recursive amorphous process by which the base cryptographic key is used, in successive cycles, to produce the extended-length cryptographic key is, because it is still a generalized combination with substitutions, still itself in the nature of a cryptographic transform.

5. The machine according to claim 4 wherein the amorphous processor comprises:
a mapping means which expands a received amorphous partition index into an amorphous bitstream of a greater number of bits than are within the amorphous partition index;
wherein feedback of the new amorphous partition index will leave one or more bits for the keystream portion;
wherein, because the amorphous process produces a number of bits beyond the partition index size, the amorphous process is called an expansion process and the amorphous processor is called an expanding amorphous processor.

6. The machine according to claim 1 for generating an extended-length cryptographic key, the machine further comprising:
6) a random number source for providing a supply of essentially random numbers;
7) a cycle control means for repetitively exercising the amorphous processor and the random number source so that, over a plurality of cycles, a plurality of amorphous bitstreams are produced by the amorphous processor;
wherein the random number source provides for a new amorphous partition index for each cycle, or in addition, the random number source provides for a new base key for each cycle as well;
wherein the entire amorphous bitstream is used as a keystream portion;
wherein the plurality of successive amorphous keystream portions constitute, in aggregate, the extended-length cryptographic key.

7. The machine according to claim 6 wherein the amorphous processor comprises:
a mapping means which contracts a received amorphous partition index into an amorphous bitstream of fewer bits than the amorphous partition index;

wherein a so5rce of amorphous partition indexes is necessary to produce a keystream;

wherein, because the amorphous process produces a number of bits fewer than the partition index size, the amorphous process is called a contracting process and the amorphous processor is called an contracting amorphous processor.

8. The machine according to claim 7 wherein the random number source comprises:

an expanding amorphous processor in a feedback configuration;

wherein cryptographic security of the plurality of amorphous bitstreams, and of the cryptographic key, generated by the machine is achieved by the contraction process;

wherein, because the expanding amorphous processor of the random number source expands while the mapping means of the amorphous processor, which amorphous processor uses the random number as a new amorphous partition index and a new base key for each cycle, contracts, the entire process is called an amorphous teeter-totter process.

9. The machine according to claim 6 wherein the random number source comprises:

a cryptographically insecure random number generator;

wherein cryptographic security of the plurality of amorphous bitstreams, and of the cryptographic key, generated by the machine is achieved by the contraction process.

10. An expanding-amorphous-process keystream generator for recursively producing from a base key having a multiplicity of binary bits in accordance with a partition index that serves to specify how an amorphous bitstream is to be formed from the base key, which partition index is itself decomposed during its use by a parameter called a partition descriptor, an amorphous keystream having binary bits of number greatly beyond those needed before cyclic behavior commences, the expanding-amorphous-process keystream generator comprising:

1) source registers for providing three quantities that are input to the keystream generation process, the source registers including 1.1) a base key source register for providing a base key having a multiplicity of binary bits, 1.2) an initial partition index source register for providing an initial partition index, the initial partition index serving to specify how an amorphous bitstream is to be formed from a base key, and 1.3) a partition descriptor source register for providing a partition descriptor, the partition descriptor serving to parameterize the decomposition of partition indexes;

2) process intermediary-result registers including 2.1) a base key register for storing the base key, 2.2) a partition descriptor register for storing the partition descriptor, 2.3) a partition index register for storing a current partition index commencing with the initial partition index, 2.4) a plurality of element descriptor registers each for storing a quantity called an element descriptor, each element descriptor elsewhere serving to parameterize a dividing of the base key into a data portion called an element, the collective element descriptors collectively serving to substantially define how a partition is to be performed on the base key to produce a plurality of elements therefrom, 2.5) a plurality of current-and-master holdback-register pairs, one register pair corresponding to each of the plurality of elements, each for holding a quantity called multiplexing information, the collective multiplexing information elsewhere serving to control the multiplexing of data from a the plurality of elements during formation of an amorphous stream, and 2.6) a plurality of emission-fragment-and-emission-count register pairs, one register pair corresponding to each element, each pair for holding a quantity called an emission fragment and also another data quantity called an emission count, these emission fragments and emission counts elsewhere serving to control the multiplexing of data from a corresponding element during the formation of the amorphous stream;

3) a partition extractor circuit means, receiving a current partition index from the partition index register and the partition descriptor from the partition descriptor register, for decomposing the current partition index in accordance with the partition descriptor into (i) a plurality of initial element descriptors for storage by the plurality of element descriptor registers, (ii) a plurality of multiplexing information for storage by the plurality of current-and-master holdback-register pairs, (iii) initial element chaining information for storage and use within a holdback multiplexer, and (iv) current element information for storage and use within the holdback multiplexer;

4) an emission generator circuit, receiving the base key from the base key register means and successive element descriptors from successive ones of plurality of element descriptor registers, for transforming each element descriptor into the emission fragments and the emission counts which are stored by the plurality of by emission-fragment-and-emission-count register pairs, and for storing a plurality of modified element descriptors back into the plurality of element descriptor registers, the emission generator means operating to choose bits from among the bits of the base key in accordance with each element descriptor, and selectively substitute bits in accordance with the same element descriptor;

5) a holdback multiplexer, receiving the emission fragments from the plurality of emission-fragment-and-emission-count register pairs plus multiplexing information from the current-and-master holdback-register pairs plus initial element chaining information and current element information from the partition extractor, for forming an amorphous stream by selecting bits from the emission fragments where each selection is subject to suspension for a given element cycle based on the multiplexing information;

6) a stream router means, receiving the amorphous stream from the holdback multiplexer, for passing an initial portion of the amorphous stream to the partition index register means, and for outputting a remainder of the amorphous stream as the keystream fragment; and 7) a control means including 7.1) an initialization cycle means serving to load the base key storage register means, the partition descriptor register means, and the partition index register means with their corresponding initial quantities respectively from the base key source register means, the partition descriptor source register means, and the initial partition index source register means, 7.2) a partition extraction cycle means serving to load the plurality of element descriptor register means, the holdback-register pairs, and the link registers internal to the holdback multiplexer means with quantities derived by the partition extractor means from its decomposition of the current partition index received from the partition index register means, and 7.3) a holdback multiplexer cycle control means for controlling the holdback multiplexer to generate the amorphous stream;

wherein feedback is provided through a next partition index which permits another partition and hence another amorphous stream to be formed;

wherein a plurality of keystream fragments result;

wherein a concatenation of successive keystream fragments is defined as the keystream.

11. The keystream generator according to claim 10 wherein the 5) holdback multiplexer comprises:

5.1) pairs for storing a doubly-linked list of the elements;

5.2) a target register for holding an address of a current element being multiplexed;

5.3) an emission counter for decrementing values contained in the emission count registers;

5.4) a holdback counter for decrementing values contained in the current holdback registers; and 5.5) a shift register for parsing bits from the emission fragment registers to form an amorphous stream.

12. The keystream generator according to claim 11 wherein the 5.1) plurality of previous-and-next-element-link register pairs means comprises:

5.1.1) a plurality of sets of previous-and-next-element-link register pairs with each set forming a chain of permuted elements;

wherein the multiplexing of element emissions proceeds by successive processing of the chains with each chain processed by assessing each element of that chain once, until all elements are exhausted.

13. The keystream generator according to claim 10 wherein the 7.3) holdback multiplexer cycle control means comprises:

7.3.1) an emission counter loading/decrementing/transferring control means for loading the emission counter means with an emission count of a target element, for decrementing the emission counter, and for transferring the decremented contents of the emission counter means back to the emission count register save for, alternatively, aborting the store cycle whenever a holdback suspension occurs or whenever an emission count is zero in which case a refill request to the emission generator is required;

7.3.2) a holdback counter loading/decrementing/transferring control means for loading the holdback counter means with a current holdback of a target element, for decrementing the holdback counter, and for transferring the contents of the holdback counter back to the current holdback register save for, alternatively, transferring a master holdback to the current holdback register whenever the decrement operation results in zero in which case a suspension has occurred;

7.3.3) a shift register loading/shifting/transferring control means for loading the shift register means with an emission fragment of a target element, for shifting the shift register means, for transferring the shifted bit to the amorphous stream, and for transferring the shifted contents of the shift register means back to the emission fragment;

7.3.4) a target element advancement control means for storing the target element contents of the element link next register in the target register means;

7.3.5) an element delinking control means for unmapping a target element from the element link registers by modifying proper registers therein whenever an element emission exhausted signal is received from the emission generator means upon a refill request failure;

7.3.6) a termination control means for detecting the unmapping of the last element and then signaling the partition extractor to evoke another partitioning of the base key; and 7.3.7) a multiplexer cycle control means for controlling the holdback multiplexer to generate the amorphous stream, the multiplexing cycle means including 7.3.7.1) an emission count reset cycle means for zeroing the emission-count registers before processing a new partition, 7.3.7.2) an element selection means for cyclically successively selecting an element, 7.3.7.3) an emission count fetch means for reading the emission count register of the selected element, 7.3.7.4) a refill cycle means for filling the selected emission register pair whenever the emission count is zero, the refill being accomplished by sending a request to the emission generator means, 7.3.7.5) an element unlink means for removing an element from the chain of elements by modifying the element link registers whenever a refill emission request returns an element exhausted signal, 7.3.7.6) a current holdback fetch means for reading the current holdback register of the selected element, and 7.3.7.7) means for returning to the partition extraction cycle means once all elements are exhausted;

14. The keystream generator according to claim 13 wherein the 4) emission generator means comprises:

4.1) a plurality of work registers which duplicate those of an element descriptor except for the path register;

4.2) a fronts buffer, being a shift-right register for holding the next front bits used while forming an element emission;

4.3) a fronts counter, being a count-down counter for holding the number of valid bits in the fronts buffer;

4.4) a tails buffer, being a shift-left register for holding the next tail bits used while forming an element emission;

4.5) a tails counter, being a count-down counter for holding the number of valid bits in the tails buffer;

4.6) a shift register for filling the fronts and tails buffers;

4.7) a path and substitution generator means for providing a stream of path selection bits and substitution bits used to form emission fragments;

4.8) an XOR means for forming emission bits;

4.9) an emission buffer, being a shift-right register for collecting the emission bits;

4.10) an emission counter, being a count-up counter for holding the number of valid bits in the emission buffer;

4.11) an emission controller means for processing a refill request from the holdback multiplexer, the emission control means including 4.11.1) a means for loading the work registers and internal registers of the path and substitution generator with the contents of the element descriptor selected by the target register, 4.11.2) a means for checking if the remainder work register is zero whereupon the refill request is terminated by sending an element exhausted signal, 4.11.3) a means for filling the fronts buffer and fronts counter including 4.11.3.1) a means for loading the sift register with a word from the base key whose address is formed by taking the current front work register value and shifting it to the right by a number determined by the number of bits in a word, 4.11.3.2) a means for pulsing the shift register to the right by a number determined by the least significant bits of the current front work register whereupon the result consists of the leading bits of the next front bits, 4.11.3.3) a means for transferring the shift register contents to the fronts buffer, 4.11.3.4) a means for computing the number of valid front bits fetched through computations based on the current front work register and last front work register values, 4.11.3.5) a means for initializing the fronts counter with the computed count value;

4.11.4) means for filling the tails buffer and tails counter which utilizes and operates in a manner symmetrical to the means used to fill the fronts buffer and fronts counter;

4.11.5) a means for resetting the emission counter to zero, 4.11.6) a means for forming an emission bit including 4.11.6.1) a means for receiving a path selection bit from the path and substitution generator, 4.11.6.2) a means for pulsing either the fronts or tails buffer selected by the path selection bit to obtain an element bit, 4.11.6.3) a means for receiving from the path and substitution generator a substitution bit which is XORed with the element bit to form an emission bit using the XOR means, 4.11.6.4) a means for advancing the bit address in the associated current front or tail work register wrapping the address is necessary to either the first front value or last tail value, and 4.11.6.5) a means for pulsing either the fronts or tails counter selected by the path selection bit and refill associated buffer and counter whenever the decrement operation results in zero, 4.11.7) a means for pulsing the emission buffer to load the emission bit, 4.11.8) a means for pulsing the emission counter and to detect emission buffer full, 4.11.9) a means for decrementing the remaining count work register and detect whenever the element emission is exhausted, 4.11.10) a means for pulsing the emission buffer to right justify the contents upon an exhausted element emission, 4.11.11) a means for transferring the emission buffer and emission counter contents to the emission fragment and emission count register pair, and 4.11.12) a means for saving the contents of the modified work registers and internal registers of the path and substitution generator to the element descriptor selected by the target register.

15. The keystream generator according to claim 14 wherein the 4.7) path and substitution generator means comprises:

4.7.1a) a path selection generation means including 4.7.1.1) a linear shift register with feedback provided directly from the linear shift register's output wherein an output bit-stream is uses successively as path selection bits; and 4.7.2) a substitution generation means including 4.7.2.1) a linear shift register with feedback provided directly from the linear shift register's output wherein output bit-stream is used successively as substitution datum bits.

16. The keystream generator according to claim 14 wherein the 4.7) path and substitution generator means comprises:

4.7.1b) a maximal length linear shift register whose output bit-stream is alternately passed as path selection bits and substitution bits.

17. The keystream generator according to claim 14 wherein the 4.7) path and substitution generator means comprises:

4.7.1c) a compound linear shift register.

18. The keystream generator according to claim 10 wherein the 2.4) plurality of element descriptor registers each for storing a quantity called an element descriptor comprise:

2.4.1) a first front register;

2.4.2) a current front register;

2.4.3) a last front register;

2.4.4) a first tail register;

2.4.5) a current tail register;

2.4.6) a last tail register;

2.4.7) a remainder register; and 2.4.8) a path register;

AND WHEREIN the 3) partition extractor circuit means comprises:

3.1) a partition index decomposition means for decomposing the partition index into (i) a permutation selector and (ii) a plurality of partition element specifiers;

3.2) a partition element specifier decomposition means for decomposing each of the plurality of partition element specifiers into a plurality of specification fields wherein each of the specification fields individually parameterizes a corresponding element, to wit (i) a size specification field specifies the number of bits in each the element, (ii) a hole specification field specifies the number of leading bits in the element to be excluded, (iii) a path-picking specification field specifies a substitutive path to be taken within the non-hole element bits, (iv) an initial item specification field specifies the starting bit for the substitutive path, (v) a truncate specification field specifies a limit to the length of the substitutive path, (vi) an initial holdback specification field specifies an initial value for the holdback counter, while (vii) a master holdback specification field specifies a holdback reset value for the holdback counter;

3.3) evaluation means for processing the specification fields into element descriptor and holdback values therein to define a partition on the base key in the form of a plurality of contiguous elements, the element descriptor contained within each of the plurality of element descriptor registers serving to parameterize a element emission, to wit (i) the 2.4.1) first front register contains a bit address of the base key of an element's first front bit, (ii) the 2.4.2) current front register contains a bit address in the base key of the element's current front bit, (iii) the 2.4.3) last front register contains a bit address in the base key of the element's last front bit, (iv) the 2.4.4) first tail register contains the bit address in the base key of the element's first tail bit, (v) the 2.4.5) current tail register contains the bit address in the base key of the element's current tail bit, (vi) the 2.4.6) last tail register contains the bit address in the base key of the element's last tail bit, (vii) the 2.4.7) remainder register contains the number of bits yet to be output as an element emission, and (viii) the 2.4.8) path register contains a value which parameterizes a substitutive path;

3.4) means for successively transferring the evaluated values to the appropriate registers; and 3.5) permuting means for mapping the permutation selector into a randomly permuted order for the elements whose order is transmitted to the holdback multiplexer by initializing the element link registers therein.

19. The keystream generator according to claim 10 wherein the 3) partition extractor circuit means comprises:

3.1) partition index decomposition means for decomposing the partition index into (i) a plurality of dispersed element specifiers and (ii) a plurality of skipper groups with exactly one skipper group associated with each dispersed element specifier;

3.2) dispersed element specifier decomposition means for decomposing each of the plurality of dispersed element specifiers into a plurality of specification fields wherein each of the specification fields individually parameterizes a corresponding element, to wit (i) a start point specification field specifies a starting bit in the base key, (ii) a skip cycles specification field specifies the number of the skippers in the corresponding skipper group, (iii) a next delta specification field specifies the number of bits to be added to the starting bit to define a secondary starting bit, (iv) an XOR cycles specification field specifies the number of bits in an xor datum specification field, (v) an initial holdback specification field specifies the initial value for the holdback counter, and (vi) a master holdback specification field specifies the holdback reset value for the holdback counter;

3.3) evaluation means for processing the specification fields and a skipper group into element descriptor and holdback values thereby defining a partition on the base key in the form of a plurality of dispersed elements wherein the registers of each element descriptor parameterize a element emission, to wit (i) a start register contains the bit address in the base key of the element's initial bit, (ii) a pointer register contains the bit address in the base key of the element's current emission bit;

(iii) a skipper count register contains the number of valid skippers in the skipper table, (iv) a skipper table is contained in a plurality of registers of sufficient number so as to hold the maximum possible count of skippers, (v) a current skipper register selects some skipper in the skipper table, (vi) a delta register contains the incremental value used to form a secondary starting bit or zero upon beginning generation of the secondary portion of the emission, as the case may be, (vii) a tap register contains the feedback tap point for the dispersed substitution generator, (vii) a XOR datum register contains the bit values for the dispersed substitution generator;

3.4) means for successively transferring the evaluated values to the appropriate registers; and 3.5) means for generating a successive ordering of the elements whose order is transmitted to the holdback multiplexer by initializing the element link registers therein.

20. The keystream generator according to claim 19 wherein the 4) emission generator circuit comprises:

4.1) a plurality of work registers duplicating those of an element descriptor except for the tap and XOR datum register;

4.2) a dispersed substitution generator, being a linear shift register of controllable length employing direct feedback wherein a tap control register specifies the feedback point within the shift register;

4.3) an XOR means for forming emission bits;

4.4) an emission buffer, being a shift-right register for collecting the emission bits;

4.5) an emission counter, being a count-up counter for holding the number of valid bits in the emission buffer;

4.6) a dispersed emission controller means for processing a refill request from the holdback multiplexer, the dispersed emission controller means including 4.6.1) means for loading the work registers and dispersed substitution generator with the contents of the element descriptor selected by the target register, 4.6.2) means for forming an emission bit including 4.6.2.1) means for fetching the base key bit selected by the pointer work register which is XORed using the XOR means with the output of the dispersed substitution generator to form an emission bit, 4.6.2.2) means for pulsing the dispersed substitution generator to advance the LSR to the next state, 4.6.2.3) means for advancing the pointer work register by adding to it the value of the skipper selected by the current skipper work register, plus one, assuming that arithmetic is such that an overflow wraps to the start address in the base key, 4.6.2.4) means for detecting the pointer crossing the starting bit whereupon the pointer work register is initialized with the secondary starting bit address computed from start and delta work registers with the delta work register zeroed unless the delta was already zero which then signals that the emission is exhausted, 4.6.2.5) means for advancing the current skipper work register by incrementing it once subject to bounding by the contents of the skipper count work register so that it addresses a valid skipper in the skipper work table, 4.6.3) means for pulsing the emission buffer to load the emission bit;

4.6.4) means for pulsing the emission counter and to detect emission buffer full;

4.6.5) means for pulsing the emission buffer to right justify the contents upon an exhausted element emission;

4.6.6) means for transferring the emission buffer and emission counter contents to the emission fragment and emission count register pair selected by the target register in the holdback multiplexer;

4.6.7) means for saving the contents of the modified work registers and dispersed substitution generator to the element descriptor selected by the target register.

21. The keystream generator according to claim 10 wherein the 1.2) initial partition index comprises:

1.2.1) a source of a message key specifying how an initial partition index is to be formed by a non-linear transformation;

1.2.2) a source of an encrypted explosion pointer which parameterizes the partition index formation;

1.2.3) CRC means for transforming a bit stream into its cyclic redundancy code;

1.2.4) a multiplicand register for holding the CRC result;

1.2.5) a holding register, being a shift register;

1.2.6) CEM means for performing a coarse encoder multiplication of an multiplicand and a multiplier stream, the CEM means including 1.2.6.1) means for forming a finite sequence of position value and XOR datum bit pairs from the multiplier stream, and 1.2.6.2) means for forming a product bit by modulo-2 addition of a XOR datum bit with a bit in the multiplicand selected by the corresponding position value;

1.2.7) a bit address register for selecting the next bit in the base key while forming a bit stream;

1.2.8) streamer means for forming a bit stream by successively incrementing the bit address register and outputting the base key bits selected, wherein cyclical addressing is employed;

1.2.9) a plain text RAM for holding a plurality of copies of the message key;

1.2.10) an encoder means including 1.2.10.1) means for forming a permutation selector and an XOR modifier of same size as the plain text from a bit stream, 1.2.10.2) means for adding bitwise modulo-2 the XOR modifier to the plain text, and 1.2.10.3) means for permuting the plain text bits in accordance with the permutation selector;

1.2.11) an expansion RAM for providing a scratch pad area while forming a partition index;

1.2.12) a bus switch means for providing access to the expansion RAM;

1.2.13) an exploder controller means including 1.2.13.1) means for storing a message key in the plain text RAM and to fill the remaining area with copies of the message key, 1.2.13.2) means for feeding the message key to the CRC and to store the result in the multiplicand register, 1.2.13.3) means for storing an encrypted explosion pointer in the bit address register, 1.2.13.4) means for filling the holding register by receiving successive product bits from the CEM which receives a multiplier stream from the streamer, 1.2.13.5) means for storing the holding register in the bit address register, 1.2.13.6) means for transforming the plain text and the streamer's bit stream by means of the encoder with the result stored in the expansion RAM as the first amorphous seed, 1.2.13.7) means for decomposing the first amorphous seed into a first partition index and a first partition descriptor, 1.2.13.8) means for transmitting first partition index and first partition descriptor to the expanding amorphous process keystream generator, 1.2.13.9) means for receiving from the keystream generator the amorphous stream, the stream router passing all of its bits, which is stored in the expansion RAM as a second amorphous seed;

1.2.13.10) means for expanding a second amorphous seed by the same process as first amorphous seed was expanded;

wherein the initial partition index is defined as the amorphous stream stored in the expansion RAM resulting from the second amorphous seed expansion;

wherein the initial partition index is derived from a smaller message key.

22. A contracting amorphous process keystream generator comprising:

1) a random number generator means for providing a random number stream, which random number stream will be amorphously compressed to form a keystream;

2) an XOR means, receiving the random number stream from the generator means, for performing modulo-2 addition on bit pairs derived from the random number stream in accordance with XOR bit values to form a plurality of data bits;

3) a segmented shift register means, receiving the plurality of data bits from the XOR means, for storing these data bits, for deleting a plurality of bit values at given addresses by process of shifting the data bits beyond a specified delete point address to recover a bit address being deleted, and for inserting a plurality of datum bits from the XOR means at specified insert addresses by first shifting the bits at and beyond an insert point to make room for a datum bit to be inserted;

4) a permuting means, receiving the random number stream from the generator means, for generating random permutations by forming a plurality of permuted indexes from the random number stream in accordance with a permutation selector;

5) a contraction controller means for forming the keystream, the contraction controller including 5.1) parsing means, receiving the random number stream from the random number generator means, for decomposing the random number stream into (i) a plurality of bit pairs sent to the XOR means as the XOR bit values, (ii) a permutation selector sent to the permuting means, (iii) a plurality of deletors sent to the segmented shift register means, each deletor serving as an deletion point address therein, and (iv) a plurality of creators sent to the segmented shift register means, each creator serving as an insert address therein, the number of creators being the same as the number of deletors;

5.2) filling means for storing a plurality of datum bits received from the XOR means in the segmented shift register means at addresses that are selected by the plurality of permuted indexes received from the permuting means;

5.3) deletion means for deleting a plurality of bits from the segmented shift register in accordance with deletors received from the parsing means, each deletor successively selects one bit to be deleted;

5.4) creation means for inserting a plurality of datum bits from the XOR means into the segmented shift register means in accordance with creators received from the parsing means, each creator successively selecting an address at which a datum bit is inserted;

wherein, upon completion of operations, the contents of the segmented shift register means forms a keystream fragment;

wherein decomposition of additional random numbers results in a plurality of keystream fragments;

wherein a concatenation of successive keystream fragments is defined as the keystream.

23. The keystream generator according to claim 22 wherein the 4) permuting means comprises:

4.1) an index extractor means for decomposing a permutation selector into a plurality of transposition indexes of quantity one less than the number of bits to permute;

4.2) a permutation buffer, being a plurality of registers of quantity equal to the number of bits to permute;

4.3) a slot counter, being a count-down counter used to address registers within the permutation buffer;

4.4) a permutation controller means for forming the permuted indexes, the permutation controller means including 4.4.1) means for initializing the permutation buffer by successively filling the registers therein with the consecutive integers starting with zero, 4.4.2) means for initializing the slot counter so that it addresses the last permutation buffer register;

4.4.3) means for receiving a transposition index used to address a permutation buffer register whose content is output as a permutated index, 4.4.4) means for storing the contents of the permutation buffer register addressed by the slot counter at the transposition index's location, 4.4.5) means for pulsing the slot counter with a registers exhausted detection capability, and permutation buffer register as a last permutated index, wherein the transposition indexes are successively transformed into a sequence of permutated indexes which define a permutation.

24. The keystream generator according to claim 23 wherein the 4.1) index extractor means comprises:

4.1.1) a selector parser means for decomposing a permutation selector into (i) a direction value and (ii) a plurality of shuffle indexes with each transposition index to be derived from one shuffle index wherein successive shuffle indexes are formed using the minimal number of bits needed to span the registers in the permutation buffer up to and including the register addressed by the slot counter;

4.1.2) a shuffle register used for holding a shuffle index value;

4.1.3) a span counter, being a count-down counter for holding the number of permutation buffer registers that a shuffle index must span;

4.1.4) a first subtracter for subtracting the span counter contents from the shuffle register contents to provide a result and a borrow signal;

4.4.5) a decrementor for decrementing by one the contents of the span counter;

4.1.6) a second subtracter for subtracting the result from first subtracter from the output of the decrementor;

4.1.7) a direction source, being a shift register using the complemented output of itself as the feedback signal;

4.1.8) an index controller means for forming the transposition indexes including 4.1.8.1) means for initializing the direction source with the direction value from selector parser, 4.1.8.2) means for initializing the span counter with the number of bits to permute, 4.1.8.3) means for loading the shuffle register with the shuffle index from selector parser, 4.1.8.4) means for outputting the contents of the shuffle register as a transposition index whenever a borrow signal from the first subtracter is active, 4.1.8.5) means for outputting either the result from the first subtracter or the second subtracter as a transposition index whenever the borrow signal from the first subtracter is inactive, wherein result selection is determined in accordance with the direction source, and to pulse the shift register in the direction source, and 4.1.8.6) means for pulsing the span counter;

wherein a sequence of transposition indexes are formed.

25. A state machine keystream generator comprising:
1) a source of a key in the form of a machine index and a state variable;
2) a process intermediary-result register means including
   2.1) a machine register means for storing a machine index, the machine index serving to parameterize a transition and output function of the state machine,
   2.2) a state register means for storing a state variable, the state variable serving to further parameterize the transition and output function during each transition,
   2.3) a dependency table means for storing pseudo random bits, filled at the start of each transition, which parameterize a state transition,
   2.4) a garbage index means for storing a garbage index which specifies how a state transition is to proceed, a garbage index comprises the various fields of (i) a global dependency index, (ii) a plurality of packed function indexes, (iii) a nibble perm selector, (iv) an accumulation index, (v) a permutation selector, (vi) a state emitter index, and (vii) an output emitter index,
   2.5) a function table means for storing a plurality of function values,
   2.6) a sum table means for storing a plurality of sum elements,
   2.7) an accumulator multiplicand register means for storing a plurality of accumulation elements; and
3) a process state transition computational means including
   3.1) a random generator means for forming random numbers, in accordance with a seeding value received from the machine register means and state register means, for storage in the dependency table means,
   3.2) a streaming CEM means for coarse encoder multiplication of a multiplicand and a multiplier stream specified by a starting address within the dependency table means to form a product value, the streaming CEM means including
      3.2.1) a streamer means for forming a multiplier stream from a starting address which selects a bit in the dependency table means, the multiplier stream consisting of a selected bit and those bits immediately following, cyclically addressed,
      3.2.2) a parsing means for forming a plurality of position value and XOR datum bit pairs from the multiplier stream,
      3.2.3) an XOR means for forming a product bit by modulo-2 addition of a XOR datum bit with a bit in the multiplicand selected by the corresponding position value, and
      3.2.4) an accumulation means for concatenating the plurality of product bits to form a product value;
   3.3) an unpacker means for expanding a packed function index received from the garbage index means into a function index, the expansion is in accordance with a global dependency index also received from the garbage index means with each resulting function index sent to an evaluator means;
   3.4) the evaluator means for transforming a function index received from the unpacker means into a function value for storage in the function table means;
   3.5) a permuting unit means for transforming function values received from the function table into sum elements for storage in the sum table, the permuting unit means including
      3.5.1) an ordering means for providing a permutated ordering of the function values in accordance with a permutation selector received from the garbage index means,
      3.5.2) a permuting-unit decomposition means for decomposing a nibble perm selector received from the garbage index means into a plurality of nib selectors, each nib selector corresponding to a pair of permutated function values taken consecutively,
      3.5.3) a permutation means for resolving a nib selectors received from the permuting-unit decomposition means into a permutation, the permutation being applied to the nibbles of the corresponding function values pair to form a sum element;
   3.6) a collecting unit means for transforming sum elements received from the sum table means into accumulation elements for storage in the accumulator multiplicand register means, the collecting unit means including
      3.6.1) a collecting-unit decomposition means for decomposing an accumulation index received from the garbage index means into a plurality of collector indexes, each collector index corresponding to a pair of sum elements, a pairing being formed with consecutive sum elements, and
      3.6.2) a combining operation means for forming an accumulation element by using a collector index received from the collecting-unit decomposition means to select a combining operation, from a plurality of functions comprised of ADD and SUB and XOR and NEG, with the selected combining operation applied to the corresponding sum element pair;
4) a bus switch means for routing multiplicands to the streaming CEM means, and product values from the streaming CEM means;
5) a transition controller means for providing a keystream fragment and a next state value, the transition controller means including
   5.1) a dependency initialization means for storing the random numbers from the random generator means into the dependency table means, wherein the random generator means is seeded with values received from the machine register means and state register means,
   5.2) a garbage initialization means for storing the product value from the streaming CEM means into the garbage index means, wherein the starting address received by the streaming CEM means is zero and the multiplicand received by the streaming CEM means is the concatenation of the machine register means and state register means routed through the bus switch means,
   5.3) a garbage parsing means for decomposing the garbage index means into its component fields,
   5.4) an unpacking means for successively transmitting to the evaluator means a plurality of function indexes formed by the unpacker means,
   5.5) an evaluation means for successively transmitting to the function table means a plurality of function values formed by the evaluator means, 5.6) a summation means for successively transmitting to the sum table means a plurality of sum elements formed by the permuting unit means, 5.7) a collection means for successively transmitting to the accumulator multiplicand register means a plurality of accumulation elements formed through by the collect unit means, 5.8) a next state means for storing the product value from the streaming CEM means as a next state variable into the state register means, wherein the starting address received by the streaming CEM means is the state emitter index from the garbage index means, and wherein the multiplicand received by the streaming CEM means is the contents of the accumulator multiplicand register means routed through the bus switch means, and 5.9) an output means for transmitting the product value from the streaming CEM means as a keystream fragment, wherein the starting address received by the streaming CEM means is the output emitter index from the garbage index means, and wherein the multiplicand received by the streaming CEM means is the contents of the accumulator multiplicand register means routed through the bus switch means;

wherein a state transition permits the process to continue;

wherein a plurality of keystream fragments result;

wherein a concatenation of successive keystream fragments is defined as the keystream.

26. The keystream generator according to claim 25 wherein the 3.1) random generator means comprises:

3.1.1) a source of an initialization value;

3.1.2) a multiplier with one multiplicand fixed serving as a congruential multiplier generator;

3.1.3) a seed register for providing a multiplicand to the multiplier;

3.1.4) a parsing register for decomposing a product from the multiplier;

3.1.5) a key table for holding a plurality of values from the multiplier;

3.1.6) a selection register for addressing a bit in the key table;

3.1.7) an XOR means for performing modulo-2 addition on a bit pair;

3.1.8) a collection register, being a shift register used to form a random value by concatenating amorphous bits;

3.1.9) a random controller means for forming a fixed quantity of random outputs, the random controller means including 3.1.9.1) means for initializing the seed register with a first seed value formed by XORing together two portions of the initialization value, 3.1.9.2) means for advancing the seed register by replacing the seed register with the product from the multiplier with the seed register's content used as the other multiplicand, 3.1.9.3) means for initializing the key table with successive products from the multiplier using the first seed value;

3.1.9.4) means for resetting the selection register to address the first key table bit, 3.1.9.5) means for filling the seed register with a second seed value formed by XORing together two additional partitions of the initialization value, 3.1.9.6) means for generating a finite sequence of amorphous bits including 3.1.9.6.1) means for advancing the seed register with the multiplier's product also stored in the parsing register, 3.1.9.6.2) means for successively decomposing the parsing register into a plurality of delta value and XOR datum bit pairs, 3.1.9.6.3) means for forming an amorphous bit by using the output of the XOR means applied with an XOR datum bit received from the parsing register and a key table bit selected by the selection register, 3.1.9.6.3) means for advancing the selection register by adding to it a delta value received from the parsing register assuming that arithmetic is such that an overflow wraps to the start address in the key table 3.1.9.7) means for storing the amorphous bit in the collection register;

wherein a random value is contained in the collection register once enough amorphous bits are generated;

wherein random values are successively generated by a fixed number of amorphous bit formation operations.

27. The keystream generator according to claim 25 wherein the 3.3) unpacker means comprises:

3.3.1) a bit address register, used in forming an unpacking stream and a plurality of creature bits;

3.3.2) unpacking streamer means for forming the unpacking stream by successively incrementing the bit address register and outputting the dependency table bits selected, wherein cyclical addressing is employed;

3.3.3) an insertible shift register, being a generalized shift register with the capacity to insert a bit value at a given address by first shifting the bits at and beyond the insert point to make room for the bit value to be inserted;

3.3.4) an insert list, being a plurality of registers used to hold addresses selecting bits within the insertible shift register;

3.3.5) a dispersed descriptor, being another plurality of register pairs for holding skipper and xor datum bit pairs;

3.3.6) a dispersed count register for holding the number of valid skipper and xor datum bit pair;

3.3.7) a current pair register for selecting some pair in the dispersed descriptor;

3.3.8) an unpacking controller means for successively transforming each packed function index into a function index, the unpacking controller means including 3.3.8.1) means for loading the bit address register with the global dependency index, 3.3.8.2) means for loading the insertible shift register with a packed function index, 3.3.8.3) means for decomposing the packed function index into an insert list index composed of a plurality of position addresses used to fill the insert list, 3.3.8.4) means for decomposing the packed function index into an unpacking index used to fill the dispersed count register;

3.3.8.5) means for resetting the current pair register so it points to a first pair in dispersed descriptor;

3.3.8.6) means for forming skipper and xor datum bit pairs from consecutive unpacking stream bits with the pairs of number according to the dispersed count register stored in the dispersed descriptor;

3.3.8.7) means for forming a plurality of creature bits of same number as position addresses with a dispersed emission process, the means including 3.3.8 7.1) means for fetching the dependency table bit selected by the bit address register which is XORed with the current xor datum bit selected by the current pair register to form a creature bit, 3.3.8.7.2) means for advancing the bit address register by adding to it the value of the current skipper selected by the current pair register assuming that arithmetic is such that an overflow wraps to the start address in the dependency table, 3.3.8.7.3) means for advancing the current pair register by incrementing it once subject to bounding by the contents of the dispersed count register so that it addresses a valid pair in the dispersed descriptor; and 3.3.8.8) means for successively inserting each creature bit into the insertible shift register at the location selected by consecutive position addresses of the insert list;

wherein the residual bit address is used to form successive function indexes for a given transition stage; and wherein upon creature bit insertion the insertible shift register contains the function index.

28. The keystream generator according to claim 25 wherein the 3.4) evaluator means comprises:

3.4.1) means for decomposing a function index into the various fields of (i) an order index, (ii) a dependency index, (iii) an operand 1 index, (iv) an operand 2 index, (v) an operand 3 index, (vi) an operation 1 index, and (vii) an operation 2 index;

3.4.2) operand maker means for transforming the three operand indexes into three operands;

3.4.3) logical operation means responsive to the operand 1 index for selecting a combining operation from a plurality of functions comprised of AND and OR and XOR and NOT, therein to combine two operands into a third;

3.4.4) arithmetic operation responsive to the operand 2 index for selecting a combining operation from a plurality of functions comprised of ADD and SUB and MUL and DIV, therein to combine two operands into a third;

3.4.5) ordering means responsive to the order index for selecting an order of the logical operation and the arithmetic operation, wherein a first operation is performed upon first and second operands followed by performing a second operation upon the third operand and a result from the first operation;

wherein the operand resulting from the second operation is defined as the function value.

29. The keystream generator according to claim 28 wherein the 3.4.2) operand maker means comprises:

3.4.2.1) operand streamer means responsive to the dependency index for selecting a bit in the dependency table with the selected bit and those bits immediately following, therein forming an operand stream from the dependency table using the dependency index to the select the starting bit;

3.4.2.2) a dispersed descriptor, being a plurality of register pairs for holding skipper and xor datum bit pairs;

3.4.2.3) a dispersed count register for holding the number of valid skipper and xor datum bit pair;

3.4.2.4) a current pair register for selecting some pair in the dispersed descriptor;

3.4.2.5) an emission pointer register for selecting a bit in the garbage index;

3.4.2.6) an operand register, being a shift register used to form an operand by concatenating emission bits;

3.4.2.7) an operand controller means for successively transforming each operand index into an operand, the operand controller means including 3.4.2.7.1) means for decomposing an operand index into an extraction index used to fill the dispersed count register, and a source index used to initialize the emission pointer register;

3.4.2.7.2) means for resetting the current pair register so it points to the first pair;

3.4.2.7.3) means for forming skipper and xor datum bit pairs from consecutive operand stream bits with the pairs of number according to the dispersed count register stored in the dispersed descriptor;

3.4.2.7.4) means for forming an emission bit including 3.4.2.7.4.1) means for fetching the garbage index bit selected by the emission pointer register which is XORed with the current xor datum bit selected by the current pair register to form an emission bit, 3.4.2.7.4.2) means for advancing the emission pointer register by adding to it the value of the current skipper selected by the current pair register assuming that arithmetic is such that an overflow wraps to the start address in the garbage index, and 3.4.2.7.4.3) means for advancing the current pair register by incrementing it once subject to bounding by the contents of the dispersed count register so that it addresses a valid pair in the dispersed descriptor;

3.4.2.7.5) means for storing the emission bit in the operand register;

wherein an operand is contained in the operand register once enough emission bits are generated;

wherein the three operands are successively generated using the operand stream continuously.

30. A state machine for generating an extended-length cryptographic key by non-linear processes, the machine comprising:

1) a state transition means for transforming a state variable into an keystream fragment and a next state variable in accordance with a directive called a machine index, the state transition means including 1.1) a dependency formation means for generating a plurality of random bits from the machine index and state variable, the dependency bits serving as dependent parameters for subsequent operations;

1.2) a garbage index formation means for deriving from the machine index, state variable, and dependency bits a garbage index;

1.3) a parsing means for decomposing the garbage index into a plurality of fields which provide for a transition function and an output function;

1.4) a field expansion means for exploding certain fields;

1.5) evaluation means, interpreting the fields of the transition and output functions as directives, for forming operands and selectively performing operations thereon, the selected operations on the formed operands producing intermediary results which are used as operands for additional operations to be selected with additional fields, this evaluation process terminating after a predetermined number of levels into a final result;

wherein a state transition permits the process to continue;

wherein a plurality of keystream fragments result;

wherein a concatenation of successive keystream fragments is defined as the keystream.

31. The machine according to claim 30 wherein the 1.1) dependency formation means comprises:

1.1.1) a dispersed amorphous process using the output of congruential multiplier random generators as input.

32. The machine according to claim 30 wherein the 1.2) garbage index formation means comprises:

1.2.1) a streaming CEM.

33. The machine according to claim 30 wherein the field expansion means operates to explode certain fields by injecting dependency bits into the fields at points selected by a dispersed emission stream of dependency bits.

* * * * *